US008654842B2

(12) United States Patent
Ganesh et al.

(10) Patent No.: US 8,654,842 B2
(45) Date of Patent: Feb. 18, 2014

(54) ACCELERATED VIDEO ENCODING

(75) Inventors: Anand Ganesh, Redmond, WA (US);
Donald J. Munsil, Kirkland, WA (US);
Gary J. Sullivan, Redmond, WA (US);
Glenn F. Evans, Kirkland, WA (US);
Shyam Sadhwani, Bellevue, WA (US);
Stephen J. Estrop, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 1651 days.

(21) Appl. No.: 11/673,423

(22) Filed: Feb. 9, 2007

(65) Prior Publication Data

US 2007/0201562 A1    Aug. 30, 2007

Related U.S. Application Data

(63) Continuation-in-part of application No. 11/276,336, filed on Feb. 24, 2006.

(51) Int. Cl.
*H04N 7/12* (2006.01)
(52) U.S. Cl.
USPC ............ 375/240.12; 375/240.22; 375/240.25; 382/232
(58) Field of Classification Search
USPC ........... 375/240.22, 240.12, 240.16; 382/232, 382/239
See application file for complete search history.

(56) References Cited

U.S. PATENT DOCUMENTS

| | | | |
|---|---|---|---|
| 5,805,228 A * | 9/1998 | Proctor et al. ........... 375/240.22 |
| 5,926,226 A | 7/1999 | Proctor et al. |
| 5,990,958 A | 11/1999 | Bheda et al. |
| 6,044,408 A | 3/2000 | Engstrom et al. |
| 6,101,276 A | 8/2000 | Adiletta et al. |
| 6,128,026 A | 10/2000 | Brothers, III |
| 6,252,905 B1 | 6/2001 | Pokrinchak et al. |
| 6,434,196 B1 * | 8/2002 | Sethuraman et al. ..... 375/240.12 |
| 6,721,359 B1 | 4/2004 | Bist et al. |

(Continued)

FOREIGN PATENT DOCUMENTS

| | | |
|---|---|---|
| EP | 1347650 | 9/2003 |
| WO | WO0207446 A2 | 1/2001 |
| WO | WO0219095 | 3/2002 |

OTHER PUBLICATIONS

Rossi, "Multicore Signal Processing Platform with Heterogeneous Configurable Hardware Accelerators", 2013, IEEE, p. 1-14.*

(Continued)

*Primary Examiner* — Taghi Arani
*Assistant Examiner* — Gregory Lane
(74) *Attorney, Agent, or Firm* — Carole A Boelitz; Raghu Chinagudabha; Micky Minhas

(57) ABSTRACT

A video encoding acceleration service to increase one or more of the speed and quality of video encoding is described. The service acts as an intermediary between an arbitrary video encoder computer program application and arbitrary video acceleration hardware. The service receives one or more queries from the video encoder to identify implementation specifics of the video acceleration hardware. The service interfaces with the video acceleration hardware to obtain the implementation specifics. The service communicates the implementation specifics to the video encoder. The implementation specifics enable the video encoder to: (a) determine whether one or more of speed and quality of software encoding operations associated with the video encoder can be increased with implementation of a pipeline of one or more supported encoding pipeline configurations and capabilities, and (b) implement the pipeline by interfacing with the service.

20 Claims, 7 Drawing Sheets

(56) References Cited

U.S. PATENT DOCUMENTS

| | | | |
|---|---|---|---|
| 6,748,019 | B1 | 6/2004 | Lin et al. |
| 7,634,776 | B2* | 12/2009 | Parameswaran et al. ..... 718/105 |
| 2002/0065952 | A1 | 5/2002 | Sullivan et al. |
| 2002/0114394 | A1* | 8/2002 | Ma .......................... 375/240.16 |
| 2003/0052909 | A1 | 3/2003 | Mo et al. |
| 2003/0118103 | A1* | 6/2003 | Guevorkian et al. ..... 375/240.12 |
| 2003/0156643 | A1 | 8/2003 | Song |
| 2003/0195998 | A1 | 10/2003 | Estrop |
| 2004/0228405 | A1 | 11/2004 | Yu et al. |
| 2004/0268397 | A1* | 12/2004 | Dunbar et al. .................. 725/88 |
| 2005/0024363 | A1 | 2/2005 | Estrop |
| 2005/0025241 | A1 | 2/2005 | Sullivan et al. |
| 2005/0063461 | A1 | 3/2005 | Lee et al. |
| 2005/0078119 | A1 | 4/2005 | Chiaruzzi et al. |
| 2005/0094730 | A1 | 5/2005 | Chang et al. |
| 2005/0123057 | A1* | 6/2005 | MacInnis et al. ......... 375/240.25 |
| 2006/0056708 | A1* | 3/2006 | Shen et al. .................... 382/232 |
| 2006/0197765 | A1* | 9/2006 | Dutta et al. ................... 345/506 |

OTHER PUBLICATIONS

"CinePlayer DVD Decoder Pack for Windows XP; Summary", http://www.sonic.com/products/Consumer/CinePlayer/Technology/acceleration.aspx. 14 pages.

http://www.hisdigital.com/html/9000series_brochure.pdf.

http://msdn.microsoft.com/library/default.asp?url=/library/en-us/graphics/hh/graphics/dxvaguide_d531ae3a-1132-44e9-9931-d0bdd76e676f.xm.asp.

http://www.nforcershq.com/article-print-891.html.

"OC Workbench", http://www.ocworkbench.com/hardware/Leadtek/winfast%20gts/winfast2.htm, 2 pages.

"Sage TV; Why does SageTV "look" better than it's competition? (picture quality)", http://htpcnew.com/main/php? id=interview1, 3 pages.

"Why MetaVR Uses Microsoft DirectX", http://www.metavr.com/technology/directx.html, 3 pages.

"Windows Media; Enabling DirectX Video Acceleration", http://msdn.microsoft.com/library/default.asp?url=/library/en-us/wmform95/htm/enablingdirectxvideoacceleration.asp, 3 pages.

"CinePlayer DVD Decoder Pack for Windows XP; Summary", http://www.sonic.com/products/Consumer/CinePlayer/Technology/acceleration.aspx. Feb. 23, 2006, 14 pages.

Excalibur RADEON, http://www.hisdigital.com/html/9000series_brochure.pdf downloaded at least as early as Jun. 15, 2005.

http://msdn.microsoft.com/library/default.asp?url=/library/en-us/graphics/hh/graphics/dxvaguide_d531ae3a-1132-44e9-9931-d0bdd76e676f.xm.asp downloaded at least as early as Jun. 15, 2005.

http://www.nforcershq.com/article-print-891.html downloaded at least as early as Jun. 15, 2005.

"OC Workbench", http://www.ocworkbench.com/hardware/Leadtek/winfast%20gts/winfast2.htm, Feb. 23, 2006, 2 pages.

"Sage TV; Why does SageTV "look" better than it's competition? (picture quality)", http://htpcnew.com/main/php?id=interview1, Feb. 23, 2006, 3 pages.

"Why MetaVR Uses Microsoft DirectX", http://www.metavr.com/technology/directx.html, Feb. 23, 2006, 3 pages.

"Windows Media; Enabling DirectX Video Acceleration", http://msdn.microsoft.com/library/default.asp?url=/library/en-us/wmform95/htm/enablingdirectxvideoacceleration.asp, Feb. 23, 2006, 3 pages.

Barjatya, "Block Matching Algorithms for Motion Estimation", Digital Image Processing in Natural Sciences and Medicine, No. class ece 6620, Apr. 26, 2004, pp. 1-6.

Extended European Search Report mailed Jul. 5, 2012 for European patent application No. 07751404.0, 16 pages.

Harrand, et al., "A Single-Chip CIF 30-Hz, H261, H263, and H263+ Video Encoder/Decoder with Embedded Display Controller", IEEE Journal of Solid-State Circuits, IEEE Service Center, Piscataway, NJ, USA, vol. 34, No. 11, Nov. 1, 1999.

Kelly, et al., "Fast Image Interpolation for Motion Estimation using Graphics Hardware", Real-Time Imaging VIII, Jan. 20-22, 2004, San Jose, CA, USA, Proceedings of Electronic Imaging, Science and Technology, Jan. 20, 2004, pp. 184-194.

Korean Office Action mailed Apr. 24, 2012 for Korean patent application No. 10-2008-7020009, a counterpart foreign application of US patent No. 7,929,599, 3 pages.

Pastrnak, et al., "Hierarchical QoS concept for Multiprocessor System-on-chip" Workshop on Resource Management for Media Processing in Networked Embedded Systems, Mar. 31, 2005, pp. 139-142.

Sullivan, et al., "Windows Platform Design Notes: Designing Hardward for the Microsoft Family of Operating Systems—Microsoft DirectX VA: Video Acceleration API/DDI" Jan. 23, 2001, pp. 1-88, retrieved from the internet at http://download.microsoft.com/download/1/6/1/161ba512-40e2-4cc9-843a-923143f3456c/.

Yang, et al., "Search Speed and Power Driven Integraged Software and Hardware Optimizations for Motion Estimation Algorithms", 2004 IEEE International Conference on Multimedia and Expo, Jun. 27-30, 2004, Taipei, Taiwan, IEE Operations Center, Piscataway, NJ, vol. 1, pp. 707-710.

JP Office Action mailed Dec. 25, 2012 for JP patent application No. 2008-556422 a counterpart foreign application of US patent No. 7,929,599, 8 pages.

Shen et al., "Accelerate Video Decoding With Generic GPU", IEEE Transaction on Circuits and Systems for Video Technology, IEEE, May 2005, vol. 15, No. 5, pp. 685-pp. 693.

Cheng et al., "Fast Blocking Matching Algorithms for Motion Estimation", 1996 IEEE International Conference on Acoustics, Speech, and Signal Processings Proceedsings, Alanta, May 7-10, 1996, pp. 2311-2314.

European Office Action mailed May 25, 2013 for European Patent Application No. 07751404.0, a counterpart foreign application of US Patent No. 7,929,599, 7 pages.

* cited by examiner

Motion Estimation Parameters

ACCELERATED VIDEO ENCODING

RELATED APPLICATIONS

This application is a continuation-in-part of co-pending U.S. patent application Ser. No. 11/276,336 filed on Feb. 24, 2006, titled "Accelerated Video Encoding", and hereby incorporated by reference.

BACKGROUND

Multimedia content production and distribution operations typically include video encoding. Video encoding processes are typically very data and computationally intensive. As a result, video encoding processes can be very time consuming. For example, it may take several tens-of hours for a software encoder to encode a high-quality high definition movie. Since quality and speed of video encoding processes are significant factors for successful multimedia content production and distribution pipelines, systems and techniques to increase the speed at which high quality video content can be encoded would be useful.

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

In view of the above, a video encoding acceleration service to increase one or more of the speed and quality of video encoding is described. The service acts as an intermediary between an arbitrary video encoder computer program application and arbitrary video acceleration hardware. The service receives one or more queries from the video encoder to identify implementation specifics of the video acceleration hardware. The service interfaces with the video acceleration hardware to obtain the implementation specifics. The service communicates the implementation specifics to the video encoder. The implementation specifics enable the video encoder to: (a) determine whether one or more of speed and quality of software encoding operations associated with the video encoder can be increased with implementation of a pipeline of one or more supported encoding pipeline configurations and capabilities, and (b) implement the pipeline by interfacing with the service.

BRIEF DESCRIPTION OF THE DRAWINGS

In the Figures, the left-most digit of a component reference number identifies the particular Figure in which the component first appears.

DETAILED DESCRIPTION

Overview

Figure 1:
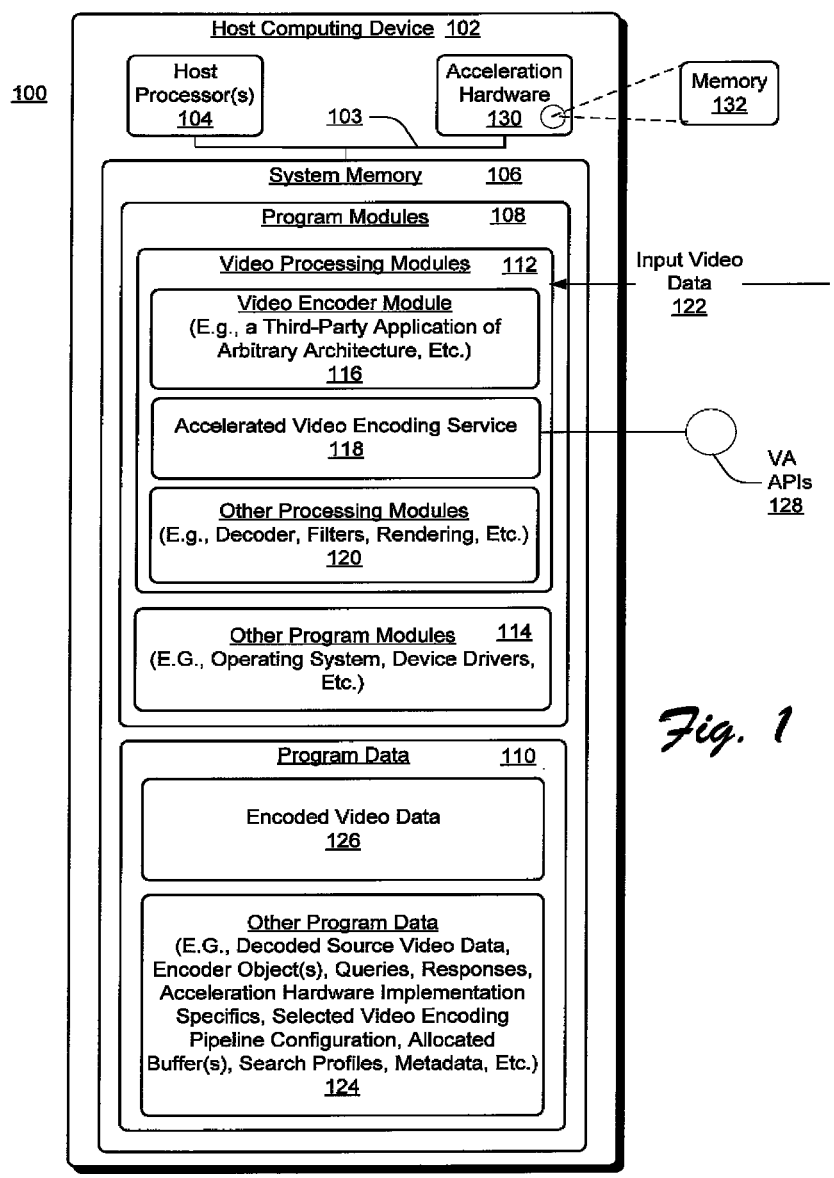
FIG. 1 illustrates an exemplary system for accelerated video encoding, according to one embodiment.

Systems and methods for accelerated video encoding provide a video encoding acceleration service. This service allows an arbitrary video encoder application to interface, in a device independent manner, with arbitrary video acceleration hardware to define and implement a substantially optimal video encoding pipeline. To accomplish this, the service exposes video acceleration (VA) application program interfaces (APIs). These APIs encapsulate a model of the video encoding process. To define an encoding pipeline, the video encoder application uses the VA APIs to query implementation specifics (e.g., capabilities, etc.) of available video (graphics) acceleration hardware. The video encoder evaluates these specifics in view of the application's particular video encoding architecture (software-implemented) to identify any encoding operations that could benefit (e.g., speed and/or quality benefits) from being accelerated in hardware. Such operations include, for example, motion estimation, transform, and quantization operations and inverse operations such as Motion compensation, inverse transforms and inverse quantization. The API also allows the video encoder to design an encoding pipeline that substantially minimizes dataflow transitions across buses and processors associated with the host computing device and the acceleration hardware, and thereby, further increase encoding speeds. The API also allows the acceleration hardware to influence the location of the data to improve local caching (e.g. the video acceleration hardware may functional more efficiently on memory local to the video hardware).

Based on these evaluations the video encoder designs a customized video encoding pipeline that performs some number of encoding operations in software and some number of encoding operations using the acceleration hardware (i.e., at least a subset of the operations that could benefit from being hardware accelerated). The encoder application then uses the API to create the pipeline and encode video content. This customized pipeline is substantially optimized as compared to a completely software-implemented pipeline because certain encoding operations are accelerated and data transitions between the host and the acceleration hardware are minimized. Additionally, processing time freed up by accelerating certain aspects of the encoding process and minimizing data transitions allow the host processor(s) to perform higher-quality encoding operations with freed-up processing cycles. The API is also designed to allow components to operate in parallel so that computational resource usage can be maximized.

These and other aspects of the systems and methods for accelerated video encoding are now described in greater detail.

An Exemplary System

Although not required, the systems and methods for accelerated video encoding are described in the general context of computer-executable instructions (program modules) being executed by a computing device such as a personal computer and graphics (video) encoding acceleration hardware. Program modules generally include routines, programs, objects, components data structures, etc., that perform particular tasks or implement particular abstract data types.

FIG. 1 shows an exemplary system 100 for accelerated video encoding, according to one embodiment. System 100 includes host computing device 102. Host computing device 102 represents any type of computing device such as a personal computer, a laptop, a server, handheld or mobile computing device, etc. Host computing device 102 includes one or more processing units 104 coupled across a bus 103 to system memory 106. System memory 106 includes computer-program modules ("program modules") 108 and program data 110. A processor 104 fetches and executes computer-program instructions from respective ones of the program modules 108. Program modules 108 include video processing modules 112 for processing video content, and other program modules 114 such as an operating system, device drivers (e.g., for interfacing to video encoding acceleration hardware, etc.), and/or so on. Video processing modules 112 include, for example, video encoder 116, video encoding acceleration service 118, and other processing modules 120, for example, a video decoder, video filter(s), a video renderer, etc.

In this implementation, video encoder 116 is an arbitrary video encoder. This means that the particular architecture, operation, data formats, etc, implemented and/or utilized by video encoder 116 are arbitrary. For example, video encoder 116 may be distributed by a third party, an OEM, etc. Additionally, although FIG. 1 shows video encoding acceleration service 118 independent of the operating system portion of "other program modules" 114, in one implementation, video encoding acceleration service 118 is part of the operating system.

Video processing modules 112 receive compressed or uncompressed input video data 122. When input video data 122 is compressed (already encoded), video processing modules 112 decode the input video data 122 to produce decoded source video data. Such decoding operations are performs by a decoder module. In another implementation, partially decoded data could also be retained to farther assist the encoding process. For purposes of exemplary illustration, such a decoder module is shown as a respective portion of "other video processing modules" 120. Thus, decoded source video data is represented either by input video data 122 that was received in a decoded state, or represented with results of decoding input video data 122 that was received in an encoded state. Decoded source video data is shown as a respective portion of "other program data" 124.

To design and implement a customized video encoding pipeline that can be used to encode decoded source video data into encoded video data 126, video encoder 116 interfaces with video encoding acceleration service 118 via video acceleration (VA) APIs 128. One exemplary implementation of multiple possible implementations of VA APIs 128 is described in the Appendix. To define an encoding pipeline, the video encoder application uses respective ones of the VA API 128 (e.g., please see the Appendix, §3.4, IVideoEncoderService) to obtain implementation specifics of available acceleration hardware 130. Such implementation specifics include, for example:

an enumerated array identifying supported video encoding pipeline configurations of the acceleration hardware 130 (e.g., obtained via the GetCapabilities interface described in the Appendix, §3.4.1);

an indication of supported video formats (e.g., MPEG, WMV, etc; please see the Appendix, GetSupportedFormats, §3.4.2);

supported search metrics for motion estimation (ME) operations (please see the Appendix, GetDistanceMetrics, §3.4.3);

supported search profiles for processing time vs. quality tradeoff decisions (please see the Appendix, GetSearchProfiles, §3.4.4); and/or supported ME capabilities, for example, image size information, maximum search window size, variable macroblock support indication, etc. (please see the Appendix, GetMECapabilities, §3.4.5)

Responsive to receiving such requests from the video encoder 116, video encoding acceleration service 118 queries the video acceleration hardware 130 for the requested implementation specifics and returns information associated with the corresponding responses from the acceleration hardware 130 to the video encoder 116. Video encoding acceleration service 118 interfaces with the video acceleration hardware 130 using a corresponding device driver. Such a device driver is shown as respective portion of "other program modules" 114.

Video encoder 116 evaluates the implementation specifics supported by acceleration hardware 130 in view of the application's particular video encoding architecture (software-implemented) to identify any encoding operations that could benefit (e.g., speed and/or quality benefits) from being accelerated in hardware, select a search profile to encapsulate a trade-off between video encoding quality and speed, minimize data transitions across buses and between processors, etc. Exemplary operations that may benefit from hardware acceleration include, for example, motion estimation, transform, and quantization. For example, one reason to perform quantization in hardware is to minimize dataflow between pipeline stages.

Figure 2:
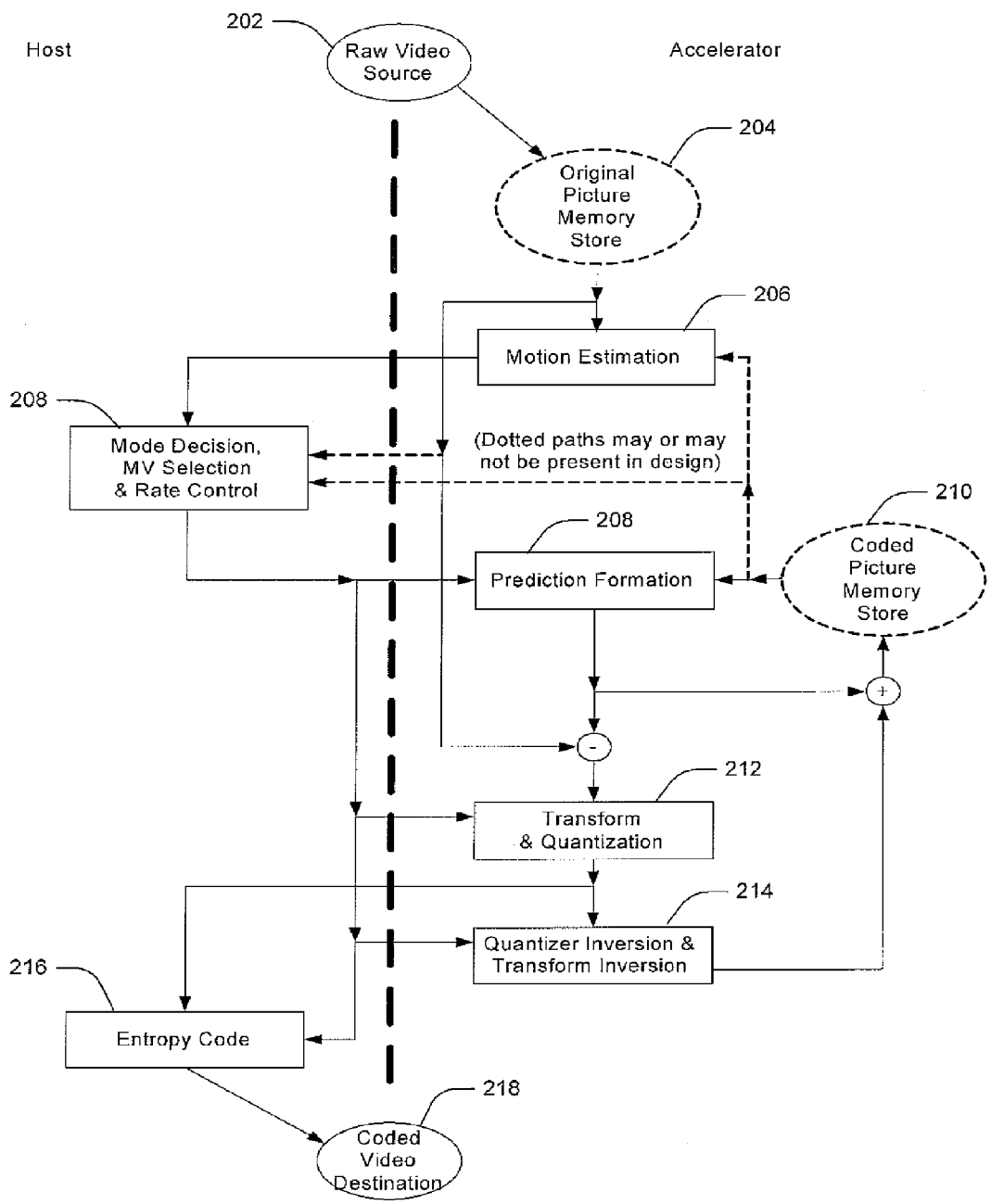
FIG. 2 shows an exemplary embodiment of a video encoding pipeline configuration, wherein some of the encoding processes are accelerated in hardware.

FIG. 2 shows an exemplary embodiment of a video encoding pipeline configuration, wherein some of the encoding processes are accelerated in hardware. For purposes of exemplary illustration and description, operations and data flow associated with FIG. 2 are described with respect to particular ones of the components of FIG. 1. In the description, the left-most number of a reference numeral indicates where the particular figure where the component/data path/referenced item was first introduced. For example, the left-most number of pipeline 200 is say "2", indicating that it is first introduced in FIG. 2. In this example, encoding pipeline 200 was configured/customized by video encoder 116 (FIG. 1) interfacing with video encoding service 118 such that respective ones of host 102 implemented processing operations are accelerated in hardware 130. For purposes of illustration, processing-operations illustrated on the right side of the bold dotted line in FIG. 2 are accelerated by hardware (e.g., acceleration hardware 130 of FIG. 1) and processing-operations illustrated on the left side of the figure are performed by the host computing device 102 (FIG. 1). In encoding pipeline 200, optional configured data access pathways are shown with non-bolded dotted lines. Ovals 204 and 212 represent respective original and coded picture memory stores.

In this example implementation, video encoder 116 (FIG. 1) takes as input some form of compressed or uncompressed video data 202 (please also see input video data 122 of FIG. 1). Please note that the exemplary pipeline configuration of FIG. 2 does not copy input source video 202 ("raw video source") to the host computing device 102 if the source 202 is not originating from the host 102 and if the host decision making engine (e.g., video encoder 116) does not use the source video. For example, if quantization decisions do not require the host to touch the video data, the data will not be transferred. In this example, pipeline 200 is configured to convert the input data 202 to another compressed form using the respective operations of blocks 206, 208 and 214 through 218.

Such operations may include converting uncompressed (YUV) video data to compressed MPEG-2, or it may include transcoding video data from MPEG-2 data format to WMV data format. For purposes of exemplary illustration, assume that the transcoding operations include a full or partial decompression stage followed by an encode stage (there are more efficient models which by-pass decompression and work purely in the transform (DCT) space). A number of video compression formats make use of motion estimation, transform and quantization to achieve compression. Of the compression stages, motion estimation is typically the slowest step, including a massive search operation where an encoder (e.g., video encoder 116) attempts to find the closest matching reference macroblock for macroblocks in a given image.

Once the optimal motion vectors are determined (e.g., via block 206) for each of the macroblocks, the encoder 116 computes the differential residues (e.g., via block 208) based on the previously coded image and the optimal motion vector. The motion vector, along with the differential residue is a compact representation of the current image. The motion vector data is further represented differentially. The host encoder can optionally request the re-evaluation of motion vectors by the video acceleration hardware to find a macroblock with a smaller combined motion vector and/or residual. The resulting differential motion vector data, and the residual data are compacted (e.g., via block 218, for example, using techniques like run-length encoding (RLE) and differential coding (e.g.: Huffman and Arithmetic coding) to generate the final coded stream of bits (encoded video data 126) to communicate to a destination (block 218) for presentation to a user. In this example, the operations of blocks 206, 208 and 214 through 218 (e.g., operations such as motion estimation (206), mode decision, motion vector (MV) selection and rate control (208), prediction formation (210), transform and quantization operations (214), quantizer inversion and transform and version (216) and entropy coding (218)) are well-known in the art and are thus not described further herein.

Referring again to FIG. 1, in one implementation, video encoder 116 is a multi-threaded application providing for full utilization of acceleration hardware 130. In this implementation, when determining which video encoding operations are to be accelerated in hardware, video encoder 116 may structure the particular pipeline configuration such that both processor 104 and acceleration hardware 130 is fully utilized. For example, when video encoding pipeline motion estimation operations are being performed by hardware for a particular frame of video data, the pipeline may be configured to perform entropy (or arithmetic or Huffman) coding operations in software by the host on a different frame of video data. An exemplary single motion vector pipeline representing the particular pipeline configuration selected/structured is described below in the Appendix in section 5.1.1. Exemplary multiple motion vector (relatively complex) pipelines wherein video encoder 116 requests multiple motion vectors from acceleration hardware 130 and selects one motion vector pipeline based on various parameters is described below in the Appendix in section 5.1.2.

With respect to selecting a search profile, the quality of motion vectors refers to a bitrate of a stream generated by the use of the motion vectors. High quality motion vectors are associated with low bitrate streams. The quality is determined by the completeness of the block search, the quality of the algorithm, the distance metric used, etc. High quality motion vectors should be used to perform high quality video encode operations. To address this, video encoding acceleration service 118 provides a generic construct called a search profile to encapsulate a trade-off between quality and time. The search profile also includes meta-data to identify the search algorithm used by the acceleration hardware 130, etc. Video encoder 116 chooses a particular search profile based on the particular requirements of the encoder's implementation.

With respect to minimizing data transitions across buses and between processors, an encode process implemented by a video encoding pipeline configuration will typically include several processing stages, each of which may or may not be accelerated via acceleration hardware 130. In cases where video encoder 116 determines to utilize hardware acceleration in successive stages of the encode pipeline, it may not be necessary to move data from acceleration hardware 130 based memory 132 to the system memory 106 associated with the host computing device 102, and then back to acceleration hardware based memory 132 for the next stage, and so on.

More particularly, while pointers to various types of video and motion vector data may be transferred back and forth between the host computing device 102 and the acceleration hardware 130, in one implementation, actual data is copied to system memory 106 only when the data pointer (a D3D9 Surface pointer) is explicitly locked using, for example, IDirect3DSurface9::LockRect. Exemplary interfaces for locking a surface are known (e.g., the well-known IDirect3DSurface9::LockRect.interface). Thus, in cases where two encoding pipeline stages follow one another, and host computing device 102 does not need to do perform any intermediate processing, host computing device 102 can decide not to "Lock" the allocated buffer between the processing stages. This will prevent a redundant memory copy of data, and thereby, avoid unnecessary data movement/transfers. In this manner, video encoder 116 design a video encoding pipeline that substantially minimizes data transfers across buses and between processors, and thereby, further increase video encoding speeds.

At this point, video encoder 116 has evaluated the implementation specifics supported by acceleration hardware 130 in view of the application's particular video encoding architecture (software-implemented) to identify any encoding operations that could benefit from being accelerated in hardware, selected a search profile, minimized data transitions across buses and between processors, and/or so on. Based on these determinations, video encoder 116 selects a particular pipeline configuration to encode decoded source video data, and thereby, generate encoded video data 126. Next, video encoder 116 interfaces with video encoding acceleration service 118 to create an encoder object to implement the selected pipeline (please see the Appendix, CreateVideoEncoder API, §3.4.6). In this implementation, an encoder object (e.g., a regular COM object) is created by identifying the selected pipeline configuration and one or more of the following: a format for the output encoded bitstream, the number of input and output data streams associated with the pipeline configuration, static configuration properties, a suggested number of buffers (surfaces) for association with the different I/O streams based on the selected pipeline configuration, and a driver specified allocator queue size based on resources a graphics device driver is able to gather, and other parameters. (Queue size and the number of data buffers are essentially referring to the same thing; one is "suggested", the other is "actual").

Next, video encoder 116 uses the created encoder object to interface with the video encoding acceleration service 118 to encode the decoded source video data. To this end, the encoder object submits execute requests to acceleration hardware 130 (please see the Appendix, IVideoEncode:Execute API, §3.2.3).

In view of the above, system 100 allows arbitrary implementations of video encoder applications 116 to define and create video encoding pipeline configurations during runtime to take full advantage of available video encoding acceleration hardware to increase encoding speed and quality. As part of these runtime configuration operations, the video encoder 116 can use VA APIs 128 to specify that the encoding pipeline is to implement iterative directed searching (multiple search passes of increasing refinement), define and use generically selectable search strategies (e.g., selecting a search algorithm based on quality metrics independent of any knowledge of details about the actual algorithm been employed), utilize format independent methodologies (e.g., where a video encoder 116 is unaware of the particular image format of input video data 122 and the acceleration hardware 130 is unaware of the compressed output format for the encoded video data 126) to control searching, adapt data sizes (e.g., where the video encoder 116 selects a macro block size based on a search algorithm), and so on.

An Exemplary Procedure

Figure 3:
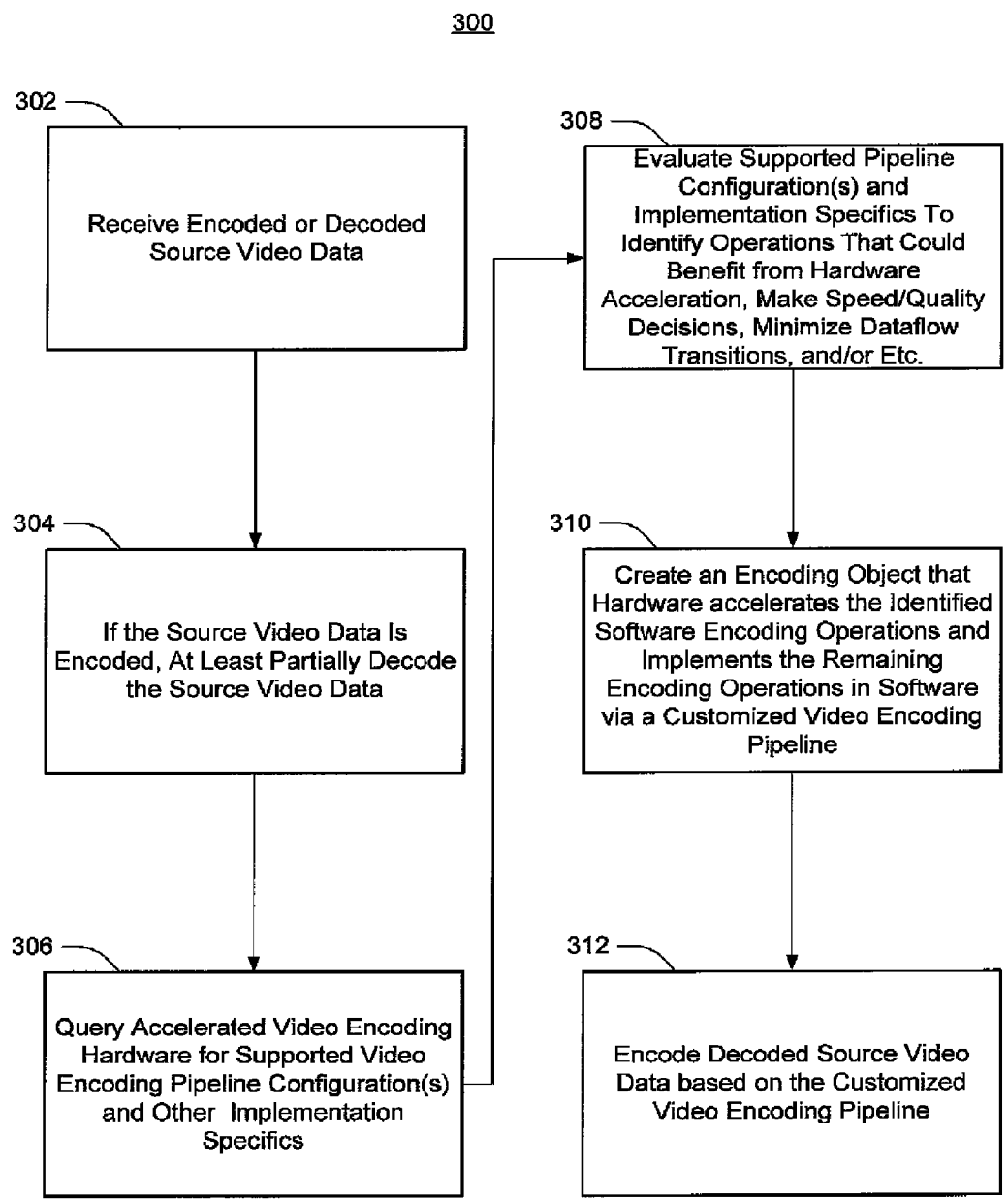
FIG. 3 shows an exemplary procedure for accelerated video encoding, according to one embodiment.

FIG. 3 shows an exemplary procedure 300 for accelerated video encoding, according to one embodiment. For purposes of exemplary description, the operations of the procedure are described with respect to components of system 100 of FIG. 1. The leftmost numeral of a component reference number indicates the particular figure where the component is first described.

At block 302, video encoder 116 (FIG. 1) receives input video data 122. If the input video data 122 is not compressed, the input video data represents decoded source video data. At block 304, if the input video data 122 is compressed, video encoder 116 decompresses the input video data to generate decoded source video data. At block 306, video encoder 116 interfaces with VA API 128 to query acceleration hardware 130 for capabilities and video encoding pipeline configuration implementation specifics. At block 308, video encoder 116 evaluates the supported capabilities and implementation specifics within the context of the implementation of the video encoder 116, to identify video encoding operations associated with the particular implementation of the video encoder 116 that may benefit from hardware acceleration, make encoding speed and/or quality decisions, minimize data transitions across busses and between processors, and/or so on.

At block 310, video encoder 116 creates an encoding object that implements an encoding pipeline configured to execute the identified video encoding operations that may benefit from hardware acceleration in acceleration hardware 130, implement the speed/quality tradeoffs (e.g., via a selected search profile), and minimize data flow transitions.

At block 312, video encoder uses the created encoder object to encode the decoded source video data according to the sequence of operations and encoding architecture delineated by the customized video encoding pipeline generated at block 310. These encoding operations of block 312 generate encoded video data 126 (FIG. 1).

CONCLUSION

Although the systems and methods for accelerated video encoding have been described in language specific to structural features and/or methodological operations or actions, it is understood that the implementations defined in the appended claims are not necessarily limited to the specific features or actions described.

For example, although API's 128 of FIG. 1 have been described within the context of encoding video data, APIs 128 can be used outside of the encoding context for hardware acceleration of other functions such as edge detection, motion-vector based noise reduction, image stabilization, sharpening, frame rate conversion, velocity computation for computer vision applications, etc. For instance with respect to noise reduction, in one implementation video encoder 116 (FIG. 1) computes motion vectors for all macroblocks of decoded source image data. Then, video encoder 116 utilizes motion magnitude, direction, and correlation to motion vectors of surrounding macroblocks to determine whether there is a local object motion in the input image. In this implementation, the video encoder 116 of then utilizes the magnitude of the vector to direct object tracking/filtering aggressiveness or average shifts of a particular object to reduce statically random noise.

In another example with respect to image stabilization, in one implementation video encoder 116 computes motion vectors for all macroblocks and decoded source data. Video encoder 116 then determines whether there is global motion in the image. This is accomplished by correlating all motion vector values and determining whether the correlated values are similar. If so, then video encoder 116 concludes that there is global motion. Alternatively the video encoder 116 utilizes a large macroblock size and determines if there is overall motion of the large macroblock. After determining whether global motion is present, if video encoder 116 also finds that the global motion vector tends to be jerky across frames, video encoder 116 concludes that there is camera jerkiness and compensates for this before starting noise filtering and encoding operations.

Accordingly, the specific features and operations of system 100 are disclosed as exemplary forms of implementing the claimed subject matter.

APPENDIX

Exemplary Video Encode Acceleration API

Video Encode

This Appendix describes various exemplary aspects of an exemplary implementation of the video encoding acceleration APIs 128 (FIG. 1) for accelerated video encoding, also referred to as Video Acceleration (VA) Encode. This is only one example of API 128 and other implementations can be implemented in view of this detailed description. In this implementation, and as already described in the detailed description, APIs 128 allow video encoder module 116 to leverage acceleration hardware 130 (e.g., a GPU) support for accelerating Motion Estimation, Residue Computation, Motion Compensation, Transform, and/or other encoding operations.

| 1 Table of Contents | |
|---|---|
| 1 Table of Contents | 18 |
| 2 Exemplary Design | 20 |
|   2.1 Encoder Layout | 20 |
|   2.2 Pipeline or Mode Configurations | 21 |
|     2.2.1 VA2_EncodePipe_Full | 21 |
|     2.2.2 VA2_EncodePipe_MotionEstimation | 22 |
| 3 Exemplary API | 23 |
|   3.1 Interface Definition | 23 |
|     3.1.1 IVideoEncoder | 23 |
|     3.1.2 IVideoEncoderService | 23 |
|   3.2 Methods: IVideoEncoder | 24 |
|     3.2.1 GetBuffer | 24 |
|     3.2.2 ReleaseBuffer | 25 |
|     3.2.3 Execute | 26 |
|   3.3 Data Structures: Execute | 28 |
|     3.3.1 VA2_Encode_ExecuteDataParameter | 28 |
|     3.3.2 VA2_Encode_ExecuteConfigurationParameter | 28 |
|     3.3.3 DataParameter_MotionVectors | 29 |
|     3.3.4 DataParameter_Residues | 29 |
|     3.3.5 DataParameter_InputImage | 30 |
|     3.3.6 DataParameter_ReferenceImages | 30 |
|     3.3.7 DataParameter_DecodedImage | 30 |
|     3.3.8 VA2_Encode_ImageInfo | 31 |
|     3.3.9 ConfigurationParameter_MotionEstimation | 31 |
|     3.3.10 VA2_Encode_SearchResolution | 32 |
|     3.3.11 VA2_Encode_SearchProfile | 32 |
|     3.3.12 VA2_Encode_MBDescription | 33 |
|     3.3.13 VA2_Encode_SearchBounds | 34 |
|     3.3.14 VA2_Encode_ModeType | 34 |
|     3.3.15 ConfigurationParameter_Quantization | 35 |
|   3.4 Methods: IVideoEncoderService | 35 |
|     3.4.1 GetPipelineConfigurations | 35 |
|     3.4.2 GetFormats | 36 |
|     3.4.3 GetDistanceMetrics | 36 |
|     3.4.4 GetSearchProfiles | 37 |
|     3.4.5 GetMECapabilities | 37 |
|     3.4.6 CreateVideoEncoder | 38 |
|   3.5 Data Structures: IVideoEncoderService | 39 |
|     3.5.1 VA2_Encode_MECaps | 39 |
|     3.5.2 VA2_Encode_StaticConfiguration | 40 |
|     3.5.3 VA2_Encode_Allocator | 40 |
|     3.5.4 VA2_Encode_StreamDescription | 41 |
|     3.5.5 VA2_Encode_StreamType | 41 |
|     3.5.6 VA2_Encode_StreamDescription_Video | 42 |
|     3.5.7 VA2_Encode_StreamDescription_MV | 42 |
|     3.5.8 VA2_Encode_StreamDescription_Residues | 42 |
|   3.6 Data Structures: Motion Vectors | 43 |
|     3.6.1 Motion Vector Layout | 43 |
|     3.6.2 New D3D Formats | 43 |
|     3.6.3 VA2_Encode_MVSurface | 44 |
|     3.6.4 VA2_Encode_MVType | 45 |
|     3.6.5 VA2_Encode_MVLayout | 45 |
|     3.6.6 VA2_Encode_MotionVector8 | 45 |
|     3.6.7 VA2_Encode_MotionVector16 | 46 |
|     3.6.8 VA2_Encode_MotionVectorEx8 | 46 |
|     3.6.9 VA2_Encode_MotionVectorEx16 | 46 |
|   3.7 Data Structures: Residues | 47 |
|     3.7.1 Luma plane | 47 |
|     3.7.2 Chroma 4:2:2 | 47 |
|     3.7.3 Chroma 4:2:0 | 48 |
| 4 Exemplary DDI Documentation | 48 |
|   4.1 Enumeration and Capabilities | 48 |
|     4.1.1 FND3DDDI_GETCAPS | 48 |
|     4.1.2 VADDI_QUERYEXTENSIONCAPSINPUT | 49 |
|     4.1.3 D3DDDIARG_CREATEEXTENSIONDEVICE | 49 |
|   4.2 Encode Functionality | 49 |
|     4.2.1 VADDI_Encode_Function_Execute_Input | 50 |
|     4.2.2 VADDI_Encode_Function_Execute_Output | 50 |
|   4.3 Extension Device Structures | 50 |
|     4.3.1 VADDI_PRIVATEBUEFER | 51 |
|     4.3.2 D3DDDIARG_EXTENSIONEXECUTE | 51 |
|     4.3.3 FND3DDDI_DESTROYEXTENSIONDEV1CE | 51 |
|     4.3.4 FND3DDDI_EXTENSIONEXECUTE | 51 |

-continued

| 1 Table of Contents | |
|---|---|
|     4.3.5 D3DDDI_DEVICEFUNCS | 51 |
|   4.4 D3D9 Structures and Functions | 52 |
| 5 Exemplary Programming Model | 52 |
|   5.1 Pipeline Efficiency | 52 |
|     5.1.1 Example: Single Motion Vector (Pipeline Full) | 52 |
|     5.1.2 Example: Multiple Motion Vectors | 55 |

2 Exemplary Design 2.1 Encoder Layout

Figure 4:
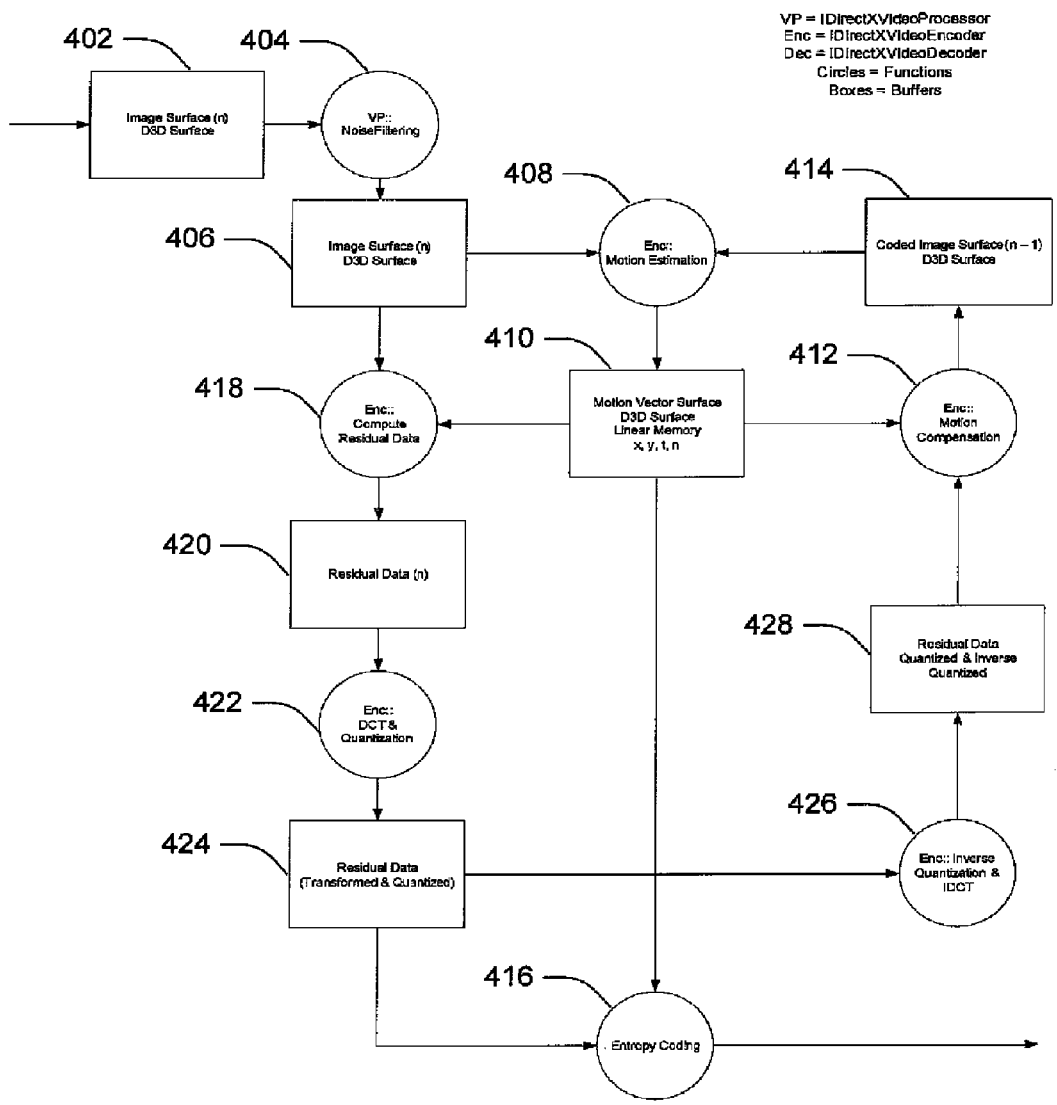
FIG. 4 in the Appendix shows an exemplary video encoder application to illustrate the manner in which video encoding acceleration application programming interfaces can be utilized, according to one embodiment.

FIG. 4 shows an exemplary video encoder application (e.g., a video encoder 116 of FIG. 1) to illustrate the manner in which video encoding acceleration APIs can be utilized, according to one embodiment. At least a subset of the APIs are exposed by accelerated video encoding service 118 of FIG. 1, thus representing respective APIs 128. In this example, video encoder 116 is implemented in the form of a DMO or MFT, although other implementations implement video encoder using different techniques. FIG. 4 shows the input data (corresponding to a "Receive") and output data after several stages of processing. The boxes represent data (or buffers) while the circles represent functions invoked by the encoder application, possibly via respective ones of APIs 128.

Block 402 represents a number n image surfaces of input data. In one implementation, each image surface represents a respective D3D surface. Operations of block 404 implement noise filtering operations. In this implementation, the noise filtering operations are implemented to by the known IDirectXVideoProcessor interface, although other interfaces could also be used. Block 406 represents noise filtered image surface data. At block 408, motion estimation operations are implemented, possibly via acceleration hardware 130 as described above. The motion vectors are represented in buffer 410. Operations of block 412 implement motion compensation. The resulting coded image surfaces are represented at block 414. Residual data computation operations of block 418 operate on image data from buffers 406 and 410, resulting in residual data in buffer 420. In view of the residual data, operations of function 422 perform DCT and quantization processes to generate the residual data of buffer 424. Entropy coding operations of function 416 and inverse quantization and IDCT operations of function 426 operate on this residual data (transformed and quantized data). Function 426 generates residual data that is quantized and inverse quantized as shown in buffer 428. In view of the data in buffer 428, function 412 implements motion compensation operations.

Significantly, the various data in respective ones of the buffer 402, 406, 414, 420, 424 and 428 are well-known in the art. Additionally, operations associated with respective ones of the functions 404, 408, 412, 416, 418, 422 and 426 are also well-known in the art. Thus it is not the respective data and details of the operations of the video encoder that are novel. In contrast to conventional encoders, encoder 116 (FIG. 1) interfaces with accelerated video encoding service 118 and corresponding exposed video acceleration APIs 128 to create a customized encoding pipeline (e.g., a pipeline 200 of FIG. 2) configuration that interfaces, in a device independent manner, with arbitrary video acceleration hardware 130. The customized pipeline may implement at least a subset of the functions illustrated in FIG. 4, and possibly more or different encoding functions. Exemplary such APIs a128 are described below, although different implementations could also be put into practice.

2.2 Pipeline or Mode Configurations

Acceleration hardware 130 (FIG. 1) is viewed as a pipeline. In this implementation, a pipeline GUID is used to describe the most basic configuration elements of the pipeline. A goal of encode speed-up may be thought of being related to a goal of pipeline efficiency.

The design allows for split (or multi-stage) pipelines where data goes back and forth between the host PC 102 and the hardware 130, before the final output is obtained. The following described pipeline configurations represent non-split, single stage pipelines.

2.2.1 VA2_EncodePipe_Full

```
// {BFC87EA2-63B6-4378-A619-5B451EDCB940}
cpp_quote( "DEFINE_GUID(VA2_EncodePipe_Full,
0xbfc87ea2, 0x63b6, 0x4378, 0xa6, 0x19, 0x5b,
0x45, 0x1e, 0xdc, 0xb9, 0x40);" )
```

Figure 5:
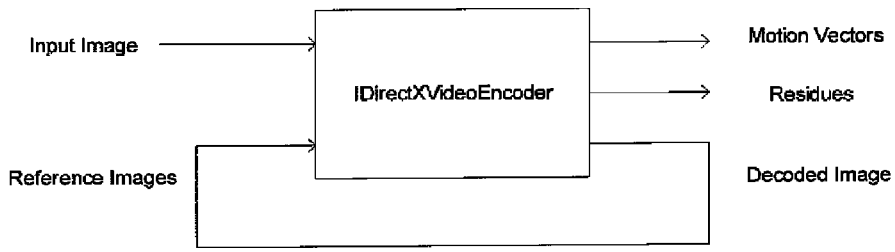
FIG. 5 in the Appendix shows an exemplary video encoding pipeline configuration, wherein acceleration hardware accelerates motion estimation, transform, quantization, and the inverse process to produce encoded images, according to one embodiment.

FIG. 5 shows an exemplary video encoding pipeline configuration, wherein acceleration hardware 130 accelerates operations for Motion Estimation, Transform, Quantization, and the inverse process to produce decoded images, according to one embodiment. The hardware produces as output Motion Vectors, Residues (luma and chroma) and a Decoded Image. The Decoded Image need not be transferred from memory 132 (associated with acceleration hardware 103) to system memory 106 as the purpose of the Decoded Image is to compute Motion Vectors for a next frame.

In this implementation, the number of streams (NumStreams) is five, although other numbers of streams could also be used. The actual StreamIds are shown in the diagram in parentheses.

(This is an example of a single stage, non-split pipeline, and hence the Stage parameter of Execute is not used).

Stream Descriptions

Note that StreamType_* is an abbreviation for VA2_Encode_StreamType_*.

Input Image
 The stream ID is one, and the stream type is StreamType_Video. This stream represents the image for which motion data is sought. The allocator for this stream is negotiable—either the current interface can supply it, or an external allocator can be used. The choice of allocator is made at the time of creation, and if an external allocator is chosen, a stream ID of one will be considered an illegal input value for GetBuffer.

Reference Images
 The stream ID is two, and the stream type is StreamType_Video. This stream represents a list of reference images used to compute motion vectors. The current interface does not supply a separate allocator for this stream. The input surfaces are recycled from the decoded image stream (ID=5), or obtained from elsewhere.

Motion Vectors
 The Stream ID is three, and the stream type is StreamType_MV. This stream represents an output parameter containing motion vector data. Buffers for this stream are obtained via GetBuffer only.

Residues
 The stream ID is four, and stream type is StreamType_Residues. This stream represents an output parameter containing residue values for all three planes. Buffers for this stream are obtained via GetBuffer only.

Decoded Image
 The stream ID is five, and the stream type is StreamType_Video. This stream represents an output parameter containing the decoded image obtained from the quantized residues and motion vector values. Buffers for this stream are obtained via GetBuffer only.

2.2.2 VA2_EncodePipe_MotionEstimation

```
// {F18B3D19-CA3E-4a6b-AC10-53F86D509E04}
cpp_quote( "DEFINE_GUID(VA2_EncodePipe_MotionEstimation,
0xf18b3d19, 0xca3e, 0x4a6b, 0xac,
0x10, 0x53, 0xf8, 0x6d, 0x50, 0x9e, 0x4);" )
```

Figure 6:
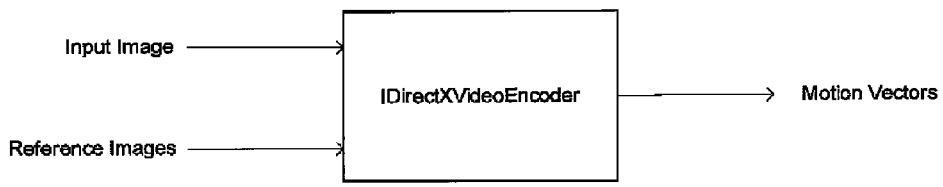
FIG. 6 in the Appendix shows an exemplary video encoding pipeline configuration in which hardware accelerates only motion estimation, according to one embodiment.

FIG. 6 shows an exemplary video encoding pipeline configuration in which hardware accelerates only Motion Estimation, according to one embodiment. This pipeline configuration takes a set of reference images as input, and dumps Motion Vectors as output. The Decoded Image in this case has to be generated and supplied by the host software.

NumStreams for this pipeline configuration is three. The StreamIds for the various streams are show in the diagram in paranthesis.

This is a single stage, non-split pipeline and the Stage parameter of Execute does not apply.

3 Exemplary API

3.1 Interface Definition

3.1.1 IVideoEncoder

```
interface IVideoEncoder : IUnknown
{
    HRESULT GetBuffer(
        [in] UINT8 StreamId,
        [in] UINT32 StreamType,
        [in] BOOL Blocking,
        [out] PVOID pBuffer
        );
    HRESULT ReleaseBuffer(
        [in] UINT8 StreamId,
        [in] UINT32 StreamType,
        [in] PVOID pBuffer
        );
    HRESULT Execute(
        [in] UINT8 Stage,
        [in] UINT32 NumInputDataParameters,
        [in, size_is(NumInputDataParameters)]
            VA2_Encode_ExecuteDataParameter** pInputData,
        [in] UINT32 NumOutputDataParameters,
        [out, size_is(NumOutputDataParameters)]
            VA2_Encode_ExecuteDataParameter** pOutputData,
        [in] UINT32 NumConfigurationParameters,
        [in, size_is(NumConfigurationParameters)]
            VA2_Encode_ExecuteConfigurationParameter**
            pConfiguration,
        [in] HANDLE hEvent,
        [out] HRESULT* pStatus
        );
}
```

3.1.2 IVideoEncoderService

```
interface IVideoEncoderService : IVideoAccelerationService
{
    HRESULT GetPipelineConfigurations(
        [out] UINT32* pCount,
        [out, unique, size_is(*pCount)] GUID** pGuids
        );
    HRESULT GetFormats(
        [out] UINT32* pCount,
```

-continued

```
    [out, unique, size_is(*pCount)] GUID** pGuids
    );
    HRESULT GetDistanceMetrics(
        [out] UINT32* pCount,
        [out, unique, size_is(*pCount)] GUID** pGuids
    );
    HRESULT GetSearchProfiles(
        [out] UINT32* pCount,
        [out, unique, size_is(*pCount)] VA2_Encode_SearchProfile**
        pSearchProfiles
    );
    HRESULT GetMECapabilities(
        [out] VA2_Encode_MECaps* pMECaps
    );
    HRESULT CreateVideoEncoder(
        [in] REFGUID PipelineGuid,
        [in] REFGUID FormatGuid,
        [in] UINT32 NumStreams,
        [in] VA2_Encode_StaticConfiguration* pConfiguration,
        [in, size_is(NumStreams)] VA2_Encode_DataDescription*
        pDataDescription,
        [in, size_is(NumStreams)] VA2_Encode_Allocator*
        SuggestedAllocatorProperties,
        [out, size_is(NumStreams)] VA2_Encode_Allocator*
        pActualAllocatorProperties,
        [out] IVideoEncoder** ppEncode
    );
};
```

3.2 Methods: IVideoEncoder 3.2.1 GetBuffer

This function returns buffers (encode surfaces) for use in the exemplary Execute call described below. The buffers are released promptly after use by calling ReleaseBuffer to avoid stalling the pipeline.

```
HRESULT GetBuffer(
    [in] UINT8 StreamId,
    [in] UINT32 StreamType,
    [in] BOOL Blocking,
    [out] PVOID pBuffer
    );
#define E_NOTAVAILABLE      HRESULT_FROM_WIN32(ERROR_INSUFFICIENT_BUFFER)
#define E_INVALIDPARAMETER  HRESULT_FROM_WIN32(ERROR_INVALID_PARAMETER)
```

Parameters

StreamId

Refers to the particular stream for which buffers are desired. Depending on the particular stream, different types of buffers like Input Image buffers, Motion Vector buffers, etc. will be returned. Not all stream IDs for a given configuration are valid inputs to this function. Allowed values for StreamId are specified as part of the pipeline configuration.

StreamType

Specifies the type of buffer to be returned. Typically, the stream type will be implied by the StreamId, and negotiated at the time of creation. If StreamType is not consistent with StreamId, the function returns an error value. The data buffer is interpreted (typecast) based on the value of StreamType as described by the table in the remarks section.

Blocking

Specifies the behaviour of the function when there is starvation, or some other need for throttling. A value of True indicates that the function should block, while False indicates that the function should return E_NOTAVAILABLE.

pBuffer

Pointer to a data buffer to be released via ReleaseBuffer. The pointer is recast (interpreted) based on the StreamType parameter, and this is described in the table in the remarks section below.

Return Values

S_OK

Function succeeded.

E_NOTAVAILABLE

This is returned when the driver is starved for buffers, and the Blocking flag was set to false.

E_INVALIDPARAMETER

The input parameters were incorrect. This may be used, for example, when StreamType does not match the expected value for the given StreamId.

VFW_E_UNSUPPORTED_STREAM

StreamId is invalid. GetBuffer does not supply buffers for the specified Stream ID. Allowed values for StreamId are described as part of the pipeline configuration. For the specified stream ID, the allocator may be external, or there may be no allocator at all.

E_FAIL

Function failed.

Remarks

Normally, this function returns control very soon as the buffers are already present in the allocator queue. The only conditions under which this function should block (or return E_NOTAVAILABLE) are when all buffers from the allocator queue have been submitted to the device, or being consumed by the application, and hence not released.

| Stream Types and Buffer Formats | |
|---|---|
| StreamType_Video | IDirect3DSurface9** pBuffer. |
| StreamType_MV | IDirect3DSurface9** pBuffer |
| StreamType_Residues | IDirect3DSurface9* pBuffer[3]. i.e. pBuffer is a pointer to three D3D surface pointers. pBuffer[0] is a pointer to the luma surface. pBuffer[1] is a pointer to the Cb surface, or NULL if not applicable. pBuffer[2] is a pointer to the Cr surface, or NULL if not applicable. |

3.2.2 ReleaseBuffer

This function is used to release a surface back into the allocator queue for reuse via GetBuffer.

```
HRESULT ReleaseBuffer(
    [in] UINT8 StreamId,
    [in] UINT8 StreamType,
    [in] PVOID pBuffer
    );
```

Parameters
    StreamId
        Stream ID associated with the buffer.
    StreamType
        Stream type for the buffer.
    pBuffer
        Buffer to be released back into the allocator queue.
Return Values
    S_OK
        Function succeeded.
    E_FAIL
        Function failed.

3.2.3 Execute

This function is used to submit requests to acceleration hardware 130. It provides input and output data buffers obtained via GetBuffer, as well as some configuration information. The function is asynchronous and its completion is indicated by the event being signaled. The completion status is indicated using the pStatus parameter which is allocated on the heap, and checked only after the event has been signaled.

The buffers supplied as parameters to this function are not be read from (eg: via LockRect), or written to by the encoding application until the function has truly completed. In this implementation, true completion is implied by an error value being returned by the function, or if this function returns success, then by the signaling of hEvent (parameter to this function). When the same buffer is input to several instances of the Execute call, it is not be accessed until all associated Execute calls have completed. The pointer to a surface in use by Execute may still be supplied as a parameter to VA functions like Execute since this doesn't require the data to be locked. This last rule explains how the same input image may be used in multiple Execute calls at the same time.

The buffers supplied to this call obey the allocator semantics negotiated at creation time. If an external allocator is used when GetBuffer is expected to be used, this function will return E_FAIL.

```
HRESULT Execute(
    [in] UINT8 Stage,
    [in] UINT32 NumInputDataParameters,
    [in, size_is(NumInputDataParameters)]
        VA2_Encode_ExecuteDataParameter** pInputData,
    [in] UINT32 NumOutputDataParameters,
    [out, size_is(NumOutputDataParameters)]
        VA2_Encode_ExecuteDataParameter** pOutputData,
    [in] UINT32 NumConfigurationParameters,
    [in, size_is(NumConfigurationParameters)]
        VA2_Encode_ExecuteConfigurationParameter** pConfiguration,
    [in] HANDLE hEvent,
    [out] HRESULT* pStatus
);
```

Parameters
    Stage
        For split pipeline configurations, this parameter identifies the specific stage of the split pipeline. The numbering is one-based, and for non-split pipelines this parameter is ignored.
    NumInputDataParameters
        Size of the input data array (next parameter).
    pInputData
        Array of pointers to input data values. Individual data pointers are recast appropriately based on the StreamId value which has an associated StreamDescription specified on creation. The data buffers are allocated on creation, and obtained during the streaming process by calling GetBuffer.
    NumOutputDataPararmeters
        Size of the output data array (next parameter).
    pOutputData
        Array of pointeres to output data values. Individual data pointers are recast appropriately based on the StreamId value which has an associated StreamDescription specified on creation. The data buffers are allocated on creation, and obtained during the streaming process by calling GetBuffer.
    NumConfigurationParameters
        Size of the configuration array (next parameter)
    pConfiguration
        Array of configuration parameters controlling the execution of the pipeline. The overall configuration is the union of this structure along with static configuration parameters supplied when the encoder was created.
    hEvent
        Event handle signalling that the output data is ready.
    pStatus
        Status indicating whether the requested operation completed successfully. Allowed values include S_OK (successful completion), E_TIMEOUT (if TimeLimit was exceeded) and E_SCENECHANGE (if scene change detection was enabled and detected). In both cases of error, none of the output surfaces contain any useful data. This parameter is allocated on the heap, and the return value is checked only after hEvent has been signaled.
Return Values
    S_OK
        Function succeeded.
    E_FAIL
        Function failed.
Remarks
    If the event handle gets signaled, it means that LockRect should complete instantly when called on any of the output surfaces since they are ready. In particular, the LockRect call is expected to not block for any length of time by waiting on any event handles. Nor is it allowed to waste CPU time through busy spins.

3.3 Data Structures: Execute

The Execute call has data parameters and configuration parameters. Specific data parameters can be thought of as deriving from VA2_Encode_ExecuteDataParameter base class (or structure) and specific configuration parameters can be thought of as deriving from VA2_Encode_ExecuteConfigurationParameter base class (or structure).

3.3.1 VA2_Encode_ExecuteDataParameter

```
typedef struct _VA2_Encode_ExecuteDataParameter {
    UINT32      Length;
    UINT32      StreamId;
} VA2_Encode_ExecuteDataParameter;
```

Members
    Length
        Number of bytes in this structure. Provided for extensibility.
    StreamId
        The ID of the data stream as defined in the pipeline configuration. The buffer formats are negotiated at creation time using the StreamDescription parameter.

3.3.2 VA2_Encode_ExecuteConfigurationParameter

```
typedef struct __VA2__Encode__ExecuteConfigurationParameter {
    UINT32      Length;
    UINT32      StreamId;
    UINT32      ConfigurationType;
} VA2__Encode__ExecuteConfigurationParameter;
#define VA2__Encode__ConfigurationType__MotionEstimation    0x1
#define VA2__Encode__ConfigurationType__Quantization        0x2
```

Members
  Length
    Number of bytes in this structure. Provided for extensibility.
  StreamId
    The ID of the data stream as defined in the pipeline configuration. This can be used to infer whether the data is input or output.
  ConfigurationType
    This parameter describes the configuration parameter, and is used to typecast the current structure appropriately.
Remarks
  This structure acts as a base type for more specialized configuration information. The base type is typecast to a more specialized type based on the ConfigurationType parameter. The mapping between ConfigurationType and the specialized structures is described in the table below.

| Configuration Types | |
|---|---|
| ConfigurationType__MotionEstimation | ConfigurationParameter__MotionEstimation |
| ConfigurationType__Quantization | ConfigurationParameter__Quantization |

3.3.3 DataParameter_MotionVectors

```
typedef struct __VA2__Encode__ExecuteDataParameter__MotionVectors {
    UINT32      Length;
    UINT32      StreamId;
    VA2__Encode__MVSurface* pMVSurface;
} VA2__Encode__ExecuteDataParameter__MotionVectors;
```

Members
  Length
    Number of bytes in this structure. Provided for extensibility.
  StreamId
    The ID of the data stream as defined in the pipeline configuration. This can be used to infer whether the data is input or output.
  pMVSurface
    Pointer to a structure containing the Motion Vector D3D Surface.

3.3.4 DataParameter_Residues

```
typedef struct __VA2__Encode__ExecuteDataParameter__Residues {
    UINT32                      Length;
    UINT32                      StreamId;
    VA2__Encode__ResidueSurface* pResidueSurfaceY;
    VA2__Encode__ResidueSurface* pResidueSurfaceCb;
    VA2__Encode__ResidueSurface* pResidueSurfaceCr;
} VA2__Encode__ExecuteDataParameter__Residues;
```

Members
  Length
    Number of bytes in this structure. Provided for extensibility.
  StreamId
    The ID of the data stream as defined in the pipeline configuration. This can be used to infer whether the data is input or output.
  pResidueSurfaceY
    Residue surface containing luma values.
  pResidueSurfaceCb
    Residue surface containing chroma Cb values.
  pResidueSurfaceCr
    Residue surface containing chroma Cr values.

3.3.5 DataParameter_InputImage

```
typedef struct __VA2__Encode__ExecuteDataParameter__InputImage {
    UINT32                  Length;
    UINT32                  StreamId;
    VA2__Encode__ImageInfo* pImageData;
} VA2__Encode__ExecuteDataParameter__InputImage;
```

Members
  Length
    Number of bytes in this structure. Provided for extensibility.
  StreamId
    The ID of the data stream as defined in the pipeline configuration. This can be used to infer whether the data is input or output.
  pImageData
    Pointer to a structure containing the input image D3D Surface. This is the surface for which motion vectors are sought.

3.3.6 DataParameter_ReferenceImages

```
typedef
struct __VA2__Encode__ExecuteDataParameter__ReferenceImages {
    UINT32                  Length;
    UINT32                  StreamId;
    UINT32                  NumReferenceImages;
    VA2__Encode__ImageInfo* pReferenceImages
} VA2__Encode__ExecuteDataParameter__ReferenceImages;
```

Members
  Length
    Number of bytes in this structure. Provided for extensibility.
  StreamId
    The ID of the data stream as defined in the pipeline configuration. This can be used to infer whether the data is input or output.
  DataType
  NumReferenceImages
    Size of reference images array (next parameter)
  pReferenceImages Array of reference images on which to base the motion vectors. For simple formats like MPEG-2 only one progressive frame (or two fields) may be used. On the other hand, formats like H.264 and VC-1 support motion vectors spanning several frames. A P-Frame in MPEG-2 uses only one reference image while a B-frame with interlaced video, and field type motion might use 4 images each of which may refer to a frame or a field.

3.3.7 DataParameter_DecodedImage

```
typedef struct _VA2_Encode_ExecuteDataParameter_DecodedImage {
    UINT32              Length;
    UINT32              StreamId;
    VA2_Encode_ImageInfo* pYCbCrImage;
} VA2_Encode_ExecuteDataParameter_DecodedImage;
```

Members
  Length
    Number of bytes in this structure. Provided for extensibility.
  StreamId
    The ID of the data stream as defined in the pipeline configuration. This can be used to infer whether the data is input or output.
  DataType
  pYCbCrImage
    Output decoded image obtained after inverse quantization, inverse transform and motion compensation. For good pipelining, the associated D3D Surface should not be locked, or the data transferred to system memory unnecessarily. The surface pointers can still be used as a Reference Image.

3.3.8 VA2_Encode_ImageInfo

```
typedef struct _VA2_Encode_ImageInfo {
    IDirect3DSurface9*   pSurface;
    BOOL                 Field;
    BOOL                 Interlaced;
    RECT                 Window;
} VA2_Encode_ImageInfo;
```

Members
  pSurface
    Pointer to a D3D surface containing the image in YCbCr format.
  Field
    A value of one indicates that the surface contains a field of video data, and the data is assumed to be interlaced. Zero indicates a full progressive frame.
  Interlaced
    A value of one indicates that the image data is interlaced. This flag should be used only when Field (above parameter) is set to one. If Field is set to one, the data is assumed to be interlaced.
  Window
    A rectangle within the image. This might be used to restrict the Motion Estimation call to return motion vectors for just a rectangle within the entire image.

3.3.9 ConfigurationParameter_MotionEstimation

```
typedef struct
_VA2_Encode_ExecuteConfigurationParameter_MotionEstimation {
```
-continued
```
    UINT32              Length;
    UINT32              StreamId;
    UINT32              ConfigurationType;
    VA2_Encode_MEParameters* pMEParams;
} VA2_Encode_ExecuteConfigurationParameter_MotionEstimation;
```

Members
  Length
    Number of bytes in this structure. Provided for extensibility.
  StreamId
    The ID of the data stream as defined in the pipeline configuration. This can be used to infer whether the data is input or output.
  ConfigurationType
  pMEParams
    Pointer to a structure defining various parameters governing motion search including search window, etc.

Figure 7:
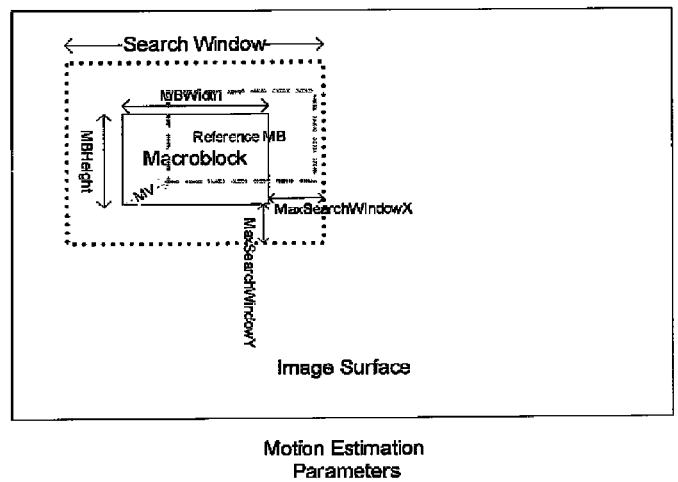
FIG. 7 in the Appendix shows several exemplary motion estimation parameters, according to one embodiment.

Remarks
  FIG. 7 shows several exemplary Motion Estimation parameters, according to one embodiment. These parameters are for use in the structures below.

3.3.10 VA2_Encode_SearchResolution

```
typedef enum {
    VA2_Encode_SearchResolution_FullPixel,
    VA2_Encode_SearchResolution_HalfPixel,
    VA2_Encode_SearchResolution_QuarterPixel
} VA2_Encode_SearchResolution;
```

Description
  FullPixel
    Motion Vectors are calculated in full pixel units.
  HalfPixel
    Motion Vectors are calculated in half-pixel units. Thus a Motion Vector value of (5, 5) refers to a macroblock of data that is (2.5, 2.5) pixels away.
  QuarterPixel
    Motion Vectors are calculated in quarter pixel units. Thus a Motion Vector value of (10, 10) refers to a macroblock of data that is (2.5, 2.5) pixels away.

In computing sub-pixel motion vector values, the encoder estimates luma and chroma values using interpolation. The specific interpolation scheme is format dependent, and the following GUIDs (part of static configuration) control the interpolation scheme.

```
// {E9AF78CB-7A8A-4d62-887F-B6A418364C79}
cpp_quote(
"DEFINE_GUID(VA2_Encode_Interpolation_MPEG2Bilinear,
0xe9af78cb, 0x7a8a, 0x4d62, 0x88, 0x7f, 0xb6, 0xa4, 0x18, 0x36, 0x4c, 0x79);" )
// (A94BBFCB-1BF1-475c-92DE-67298AF56BB0}
cpp_quote(
"DEFINE_GUID(VA2_Encode_Interpolation_MPEG2Bicubic,
0xa94bbfcb, 0x1bf1, 0x475c, 0x92, 0xde, 0x67, 0x29, 0x8a, 0xf5, 0x6b, 0xb0);" )
```

3.3.11 VA2_Encode_SearchProfile

```
typedef struct __VA2__Encode__SearchProfile {
    UINT8   QualityLevel;
    UINT8   TimeTaken;
    GUID    SearchTechnique;
    GUID    SubpixelInterpolation;
} VA2__Encode__SearchProfile;
```

Members

QualityLevel

A number in the range [0-100] that indicates the relative quality of Motion Vectors among the different profiles supported by the device.

Time Taken

A number in the range [0-100] that indicates the relative time taken for different search profiles. This enables the application to make a reasonable time-quality trade-off.

SearchTechnique

A GUID indicating the search algorithm used.

SubpixelInterpolation

A GUID indicating the subpixel interpolation scheme used.

Remarks

There is no universally accepted definition of absolute quality, so we are settling for a relative measure. The values indicated against TimeTaken should follow a strict proportion rule. If profile 1 takes 10 ms and profile 2 takes 20 ms, the TimeTaken values should be in the ratio 20/10=2.

3.3.12 VA2_Encode_MBDescription

```
typedef struct __VA2__Encode__MBDescription {
    BOOL    ConstantMBSize;
    UINT32  MBWidth;
    UINT32  MBHeight;
    UINT32  MBCount;
    RECT*   pMBRectangles;
} VA2__Encode__MBDescription;
```

Members

ConstantMBSize

A value of one indicates that all Macroblocks in the current image have the same size. This may not be true for formats like H.264.

MBWidth

Width of a macroblock. Valid only if bConstantMBSize is one.

MBHeight

Height of a macroblock. Valid only if bConstantMBSize is one.

MBCount

If bConstantMBSize is zero, then the macroblocks (or segments) in the image are described using an array of rectangles. This parameter describes the size in elements of the following pMBRectangles parameter.

pMBRectangles

An array of rectangles describing how the the image is to be cut up.

3.3.13 VA2_Encode_SearchBounds

```
typedef struct __VA2__Encode__SearchBounds {
    BOOL    DetectSceneChange;
    UINT32  MaxDistanceInMetric;
    UINT32  TimeLimit;
    UINT32  MaxSearchWindowX;
    UINT32  MaxSearchWindowY;
} VA2__Encode__SearchBounds;
```

Members

DetectSceneChange

If this value is one, then scene change detection is being requested. In such a case, if scene change is detected no motion vectors will be computed by the Execute call, and hence no residues or decoded images will be computed either. This is indicated via the pStatus parameter of the Execute call which should be set to E_SCENECHANGE in this case.

MaxDistanceInMetric

Refers to the difference between macroblocks when comparisons are made using the currently choice distance metric. If this distance exceeds this MaxDistanceInMetric value, then such a motion vector is rejected.

TimeLimit

Maximum time that the hardware is allowed to spend on the Motion Estimation stage. If it takes longer than this time, the pStatus parameter of the Execute call is set to E_TIMEOUT.

Search WindowX

Maximum value of the x component of the returned motion vector. In other words, the size (along the x-dimension) of the search window.

SearchWindowY

Maximum value of the y component of the motion vector. In other words, the size (along the y-dimension) of the search window.

Remarks

3.3.14 VA2_Encode_ModeType

```
typedef struct __VA2__Encode__ModeType {
    UINT32  SearchProfileIndex;
    GUID    DistanceMetric;
    INT16   HintX;
    INT16   HintY;
} VA2__Encode__ModeType;
```

Members

SearchProfileIndex

Index into the list of search profiles as returned by the GetSearchProfiles API call.

DistanceMetric

Metric to use when comparing two macroblocks. Commonly used metrics include SAD (Sum of Absolute Differences) and SSE (Sum of Squared Errors).

HintX

Hint about the expected direction of motion to guide the motion search. This refer to the overall motion in the image and may not be applicable on a per MB basis.

HintY

Hint about the expected direction of motion to guide the motion search. This refers to the overall motion in the image. In one implementation, this parameter value is not applicable on a per MB basis.

3.3.15 ConfigurationParameter_Quantization

```
typedef
struct __VA2_Encode_ExecuteConfigurationParameter_Quantization {
    UINT32 Length;
    UINT32 StreamId;
    UINT32 ConfigurationType;
    UINT32 StepSize;
} VA2_Encode_ExecuteConfigurationParameter_Quantization;
```

Members
Length
Number of bytes in this structure. Provided for extensibility.
StreamId
The ID of the data stream as defined in the pipeline configuration. This can be used to infer whether the data is input or output.
ConfigurationType
StepSize
Step size to be used when performing quantization. In one implementation, only one step size is used for the entire portion of the image for which Motion Vectors and Residues were requested in this particular call.

3.4 Methods: IVideoEncoderService

The methods in this interface allow an application to query the hardware for its capabilities and create an encoder object with a given configuration.

3.4.1 GetPipelineConfigurations

```
HRESULT GetPipelineConfigurations(
    [out] UINT32* pCount,
    [out, unique, size_is(*pCount)] GUID** pGuids
    );
```

Parameters
pCount
Return value describes the size of pGuids array (next parameter) returned by the function.
pGuids
An array of GUIDs describing the various pipeline configurations supported by the device. The memory is allocated by the callee (the entity being called), and should be released by the caller using CoTaskMemFree.

Return Values
S_OK
function was successful
E_OUTOFMEMORY
Function was unable to allocate memory to return the list of GUIDs
E_FAIL
Unable to determine the supported pipeline configurations because of some device error.

3.4.2 GetFormats

```
HRESULT GetFormats(
    [out] UINT32* pCount,
    [out, unique, size_is(*pCount)] GUID** pGuids
    );
```

Parameters
pCount
Return value describes the size of pGuids array (next parameter) returned by the function.
pGuids
An array of GUIDs describing the various formats supported by the device (eg: WMV9, MPEG-2, etc.). The memory is allocated by the callee, and should be released by the caller using CoTaskMemFree.

3.4.3 GetDistanceMetrics

```
HRESULT GetDistanceMetrics(
    [out] UINT32* pCount,
    [out, unique, size_is(*pCount)] GUID** pGuids
    );
```

Parameters
pCount
Return value describes the size of pGuids array (next parameter) returned by the function.
pGuids
An array of GUIDs describing the various search metrics supported by the device for motion estimation. The memory is allocated by the callee, and is released by the caller using CoTaskMemFree.

Return Values
S_OK
Function was successful
E_OUTOFMEMORY
Function was unable to allocate memory to return the list of GUIDs
E_FAIL
Unable to determine the supported metrics because of some device error.

3.4.4 GetSearchProfiles

```
HRESULT GetSearchProfiles(
    [out] UINT32* pCount,
    [out, unique, size_is(*pCount)] VA2_Encode_SearchProfile**
    pSearchProfiles
    );
```

Parameters
pCount
Return value describes the size of pGuids array (next parameter) returned by the function.
pSearchProfiles
An array of GUIDs representing the search profiles supported by the device. The search profiles allow the codec application time-quality trade-offs more effectively. The memory is allocated by the callee, and is released by the caller using CoTaskMemFree.

Return Values
S_OK
Function was successful
E_OUTOFMEMORY
Function was unable to allocate memory to return the list of GUIDs
E_FAIL
Unable to determine the supported search profiles because of some device error.

3.4.5 GetMECapabilities

```
HRESULT GetMECapabilities(
    [out] VA2_Encode_MECaps* pMECaps
);
```

Parameters
pMECaps
A pointer to the Motion Estimation capabilities of the device. This includes information about the size of image the device can handle, the maximum search window size and whether the device supports variable macroblock sizes. The memory for this is allocated by the caller.
Return Values
S_OK
Function was successful
E_FAIL
Function failed due to some device error.

3.4.6 CreateVideoEncoder

This function creates an instance of IVideoEncoder.

```
HRESULT CreateVideoEncoder(
    [in] REFGUID PipelineGuid,
    [in] REFGUID FormatGuid,
    [in] UINT32 NumStreams,
    [in] VA2_Encode_StaticConfiguration* pConfiguration,
    [in, size_is(NumStreams)] VA2_Encode_StreamDescription* pStreamDescription,
    [in, size_is(NumStreams)] VA2_Encode_Allocator* SuggestedAllocatorProperties,
    [out, size_is(NumStreams)] VA2_Encode_Allocator* pActualAllocatorProperties,
    [out] IVideoEncoder** ppEncode
);
```

Parameters
PipelineGuid
A GUID representing the pipeline configuration desired. The list of configurations is obtained via GetCapabilities, and each of the GUIDs is associated with public documentation that describes necessary details about the configuration.
FormatGuid
A GUID representing the format of the eventual encoded bitstream. Many of the encode operations like Transform and Quantization have format specific elements to them. While these format specific elements could be handled by the CPU with sufficient speed, the exchange of information will necessitate the use of extra pipeline stages and make it more difficult to achieve high pipeline efficiency.
NumStreams
Number of input and output data streams associated with the pipeline configuration. This is implied by the pipeline GUID in many cases.
pConfiguration
A pointer to static configuration properties.
pStreamDescription
An array of structures, one per stream, that describes the data flowing through that stream.
SuggestedAllocatorProperties
The caller (codec application) suggests a certain number of buffers (surfaces) to be associated with the different streams based on its pipeline design.
pActualAllocatorProperties
The driver specifies the actual allocator queue size based on resources it is able to gather, and other considerations. The assumption is that the application will abort use of this interface if it cannot build an efficient pipeline with the buffering (allocator queue size) available.
ppEncode
Output encoder object. The caller should consider this to be a regular COM object to be released via IUnknown::Release.
Return Values
S_OK
Function succeeded.
E_FAIL
Function failed (probably for lack of resources)

3.5 Data Structures: IVideoEncoderService

3.5.1 VA2_Encode_MECaps

```
typedef struct _VA2_Encode_MECaps {
    BOOL    VariableMBSizeSupported;
    BOOL    MotionVectorHintSupported;
    UINT16  MaxSearchWindowX;
    UINT16  MaxSearchWindowY;
    UINT32  MaxImageWidth;
    UINT32  MaxImageHeight;
    UINT32  MaxMBSizeX;
    UINT32  MaxMBSizeY;
} VA2_Encode_MECaps;
```

Members
VariableMBSizeSupported
A value of one indicates that the hardware supports variable macroblock sizes when performing motion estimation. In particular, if variable macroblock sizes are supported, it is legal for the caller of this API to set ConstantMBSize to zero in the VA2_Encode_MBDescription structure, and to use the pMBRectangles parameter to describe the partitioning of the image.
MotionVectorHintSupported
A value of one indicates that the hardware is capable of using some hints from the caller in its motion search algorithm. In particular, the caller may set the HintX and HintY members of VA2_Encode_ModeType which is an Execute configuration parameter.
MaxSearchWindowX
Maximum legal value of SearchWindowX, a member of VA2_Encode_SearchBounds, which is a Motion Estimation configuration parameter.
MaxSearchWindowY
Maximum legal value of SearchWindowY, a member of VA2_Encode_SearchBounds, which is a Motion Estimation configuration parameter.
MaxImageWidth
Maximum allowed width of input image.
MaxImageHeight
Maximum allowed height of input image.
MaxMBSizeX
Maximum allowed width of macroblock.
MaxMBSizeY
Maximum allowed height of macroblock.

3.5.2 VA2_Encode_StaticConfiguration

```
typedef struct __VA2__Encode__StaticConfiguration {
    GUID                        TransformOperator;
    GUID                        PixelInterpolation;
    GUID                        Quantization;
    UINT8                       NumMotionVectorsPerMB;
    VA2__Encode__MVLayout       MVLayout;
    VA2__Encode__ResidueLayout  ResLayout;
} VA2__Encode__StaticConfiguration;
```

Members
TransformOperator
A GUID representing the Transform operator—one of MPEG-2 DCT, WMV9 Transform, etc.
PixelInterpolation
A GUID representing the sub-pixel interpolation scheme to be used. The bilinear and bicubic interpolation systems have a number of coefficients that are format specific.
Quantization
A GUID representing the quantization scheme to be used.
NumMotionVectorsPerMB
The number of Motion Vectors to be computer per macroblock. The simple pipeline configurations supported by early versions of this interface may require this value to be one.
MVLayout
The layout of the Motion Vector surface.
ResidueLayout
Layout of the residue surface.

3.5.3 VA2_Encode_Allocator

```
typedef struct __VA2__Encode__Allocator {
    BOOL ExternalAllocator;
    UINT32 NumSurfaces;
} VA2__Encode__Allocator;
```

Members
ExternalAllocator
False indicates that buffers are obtained via GetBuffer while True indicates that buffers are obtained via an external allocator, or that there is no allocator associated with the stream in question. The pipeline configuration forces the value of this field in many cases (often to zero). A notable exception is in the Input Image stream that is allowed to come from an external allocator.
NumSurfaces
Number of surfaces to be associated with the allocator queue.

3.5.4 VA2_Encode_StreamDescription

```
typedef struct __VA2__Encode__StreamDescription {
    UINT32 Length;
    UINT32 StreamType;
} VA2__Encode__StreamDescription;
```

Members
Length
Length of the entire structure used to validate typecasts and allow for extensibility.
StreamType
Describes the type of data associated with this stream. Used for typecasting.
Remarks
This base structure is typecast to a derived type on the StreamType field. The typecasts are described in the documentation for VA2_Encode_StreamType.

3.5.5 VA2_Encode_StreamType

```
#define VA2__Encode__StreamType__Video      0x1
#define VA2__Encode__StreamType__MV         0x2
#define VA2__Encode__StreamType__Residues   0x3
```

Type Descriptions
VA2_Encode_StreamType_Video
The associated stream description structure may be cast to VA2_Encode_StreamDescription_Video.
VA2_Encode_StreamType_MV
The associated stream description structure may be cast to VA2_Encode_StreamDescription_MV.
VA2_Encode_StreamType_Residues
The associated stream description structure may be cast to VA2_Encode_StreamDescription_Residues.

3.5.6 VA2_Encode_StreamDescription_Video

```
typedef struct __VA2__Encode__StreamDescription {
    UINT32 Length;
    UINT32 StreamType;
    VA2__VideoDesc VideoDescription;
} VA2__Encode__StreamDescription;
```

Members
Length
Length of the entire structure used to validate typecasts and allow for extensibility.
StreamType
Describes the type of data associated with this stream. Used for typecasting.
VideoDescription
Describes various properties of the video stream including the dimensions, frame rate, color primaries, etc.

3.5.7 VA2_Encode_StreamDescription_MV

```
typedef struct __VA2__Encode__StreamDescription {
    UINT32 Length;
    UINT32 StreamType;
    VA2__Encode__MVType MVType;
    VA2__Encode__MVLayout MVLayout;
} VA2__Encode__StreamDescription;
```

Members
Length
Length of the entire structure used to validate typecasts and allow for extensibility.
StreamType
Describes the type of data associated with this stream. Used for typecasting.
MVType
Describes the type of Motion Vector structure used to return motion data. Used in interpreting the contents of the Motion Vector surface.

MVLayout
Describes how the Motion Vector structures for a given input image are laid out in memory.

3.5.8 VA2_Encode_StreamDescription_Residues

```
typedef struct __VA2__Encode__StreamDescription {
    UINT32 Length;
    UINT32 StreamType;
    VA2__Encode__SamplingType SamplingType;
    UINT32 LumaWidth;
    UINT32 LumaHeight;
    UINT32 ChromaCbWidth;
    UINT32 ChromaCbHeight;
    UINT32 ChromaCrWidth;
    UINT32 ChromaCrHeight;
} VA2__Encode__StreamDescription;
```

Members
Length
Length of the entire structure used to validate typecasts and allow for extensibility.
StreamType
Describes the type of data associated with this stream. Used for typecasting.
SamplingType
Specifies whether the residue data is 4:4:4, 4:2:2, etc.
LumaWidth
Width of the luma surface
LumaHeight
Height of the luma surface
ChromaCbWidth
Width of the surface containing the Cb residue values.
ChromaCbHeight
Height of the surface containing the Cb residue values.
ChromaCrWidth
Width of the surface containing the Cr residue values.
ChromaCrHeight
Height of the surface containing the Cr residue values.

3.6 Data Structures: Motion Vectors

3.6.1 Motion Vector Layout

Figure 8:
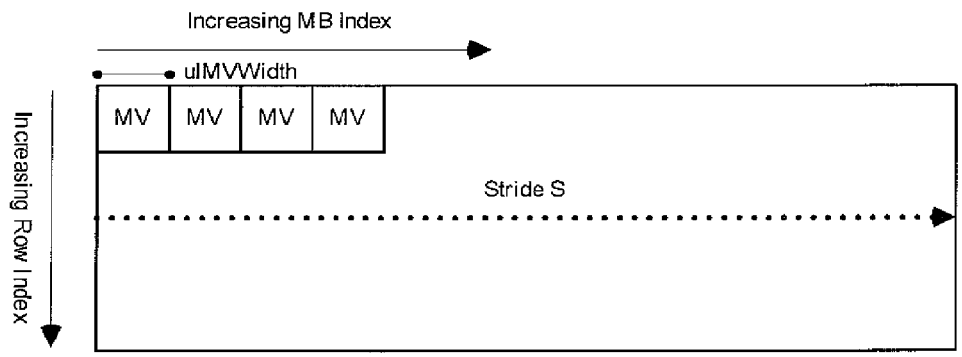
FIG. 8 in the Appendix shows exemplary motion vector data stored in a Display 3-Dimensional (D3D) surface, according to one embodiment.

FIG. 8 shows exemplary motion vector data stored in a D3D surface, according to one embodiment. Each of the cells described as "MV" is a Motion Vector structure. Different representations are used depending on the values of VA2_Encode_MVType and VA2_Encode_MVLayout. The actual structures and layouts are described below

3.6.2 New D3D Formats

```
typedef enum __D3DFORMAT
{
    D3DFMT__MOTIONVECTOR16 = 105,
    D3DFMT__MOTIONVECTOR32 = 106,
    D3DFMT__RESIDUE16      = 107,
} D3DFORMAT;
```

Motion Vectors Surfaces and Residue Surfaces are associated with the above new D3D Format types which indicate the size of individual Motion Vectors and Residues. This size information is used by the driver when the application creates surfaces using one of the surface or resource creation APIs provided by. The resource flag associated with encode surfaces is VA2_EncodeBuffer.

```
// Buffer Type
enum
{
    VA2__EncodeBuffer = 7,
};
typedef struct __D3DDDI__RESOURCEFLAGS
{
    union
    {
        struct
        {
            UINT    TextApi      : 1;   // 0x20000000
            UINT    EncodeBuffer : 1;   // 0x40000000
            UINT    Reserved     : 1;   // 0x80000000
        };
        UINT    Value;
    };
} D3DDDI__RESOURCEFLAGS;
```

3.6.3 VA2_Encode_MVSurface

This structure is effectively derived from IDirect3DSurface9, and carries state information that allows one to interpret the contents of the embedded D3D surface.

```
typedef struct __VA2__Encode__MVSurface {
    IDirect3DSurface9*          pMVSurface;
    VA2__Encode__MVType         MVType;
    VA2__Encode__MVLayout       MVLayout;
    GUID                        DistanceMetric;
} VA2__Encode__MVSurface;
```

Members
pMVSurface
Pointer to a D3D Surface containing Motion Vectors.
MVType
This value is used to identify the structure (VA2_Encode_MotionVector8, etc.) with which to interpret the individual motion vectors.
MVLayout
This value identifies how the individual Motion Vector structures are laid out in the D3D Surface.
DistanceMetric
A GUID representing the distance metric used to measure the distance between two macroblocks. The distance metric is used to identify the closest macroblock, and hence the optimal motion vector.

3.6.4 VA2_Encode_MVType

This enumeration value is used to decode the contents of the Motion Vector D3D9 Surface. Depending on the type of Motion Vector, one of several different Motion Vector structures is used to interpret the contents of the surface.

```
typedef enum {
    VA2__Encode__MVType__Simple8,
    VA2__Encode__MVType__Simple16,
    VA2__Encode__MVType__Extended8,
    VA2__Encode__MVType__Extended16
} VA2__Encode__MVType;
```

Description
VA2_Encode_MVType_Simple8
The Motion Vector structure is VA2_Encode_MotionVector8.
VA2_Encode_MVType_Simple16
The Motion Vector structure is VA2_Encode_MotionVector16.

VA2_Encode_MVType_Extended8
The Motion Vector structure is VA2_Encode_MotionVectorEx8.
VA2_Encode_MVType_Extended16
The Motion Vector structure is VA2_Encode_MotionVectorEx16.

3.6.5 VA2_Encode_MVLayout

```
typedef enum {
    VA2_Encode_MVLayout_A,
    VA2_Encode_MVLayout_B,
    VA2_Encode_MVLayout_C
} VA2_Encode_MVLayout;
```

Description
Type A
The actual D3D surface is an array of Motion Vector structures indexed by Macroblock Index and Row Index.
Type B
This is a packed layout where the number of Motion Vectors per Macroblock is not constant. Details TBD.
Type C

3.6.6 VA2_Encode_MotionVector8

```
typedef struct _VA2_Encode_MotionVector8 {
    INT8    x;
    INT8    y;
} VA2_Encode_MotionVector8;
```

Members
x
x-coordinate of the Motion Vector.
y
y-coordinate of the Motion Vector.

3.6.7 VA2_Encode_MotionVector16

```
typedef struct _VA2_Encode_MotionVector16 {
    INT16    x;
    INT16    y;
} VA2_Encode_MotionVector16;
```

Members
x
x-coordinate of the Motion Vector.
y
y-coordinate of the Motion Vector.

3.6.8 VA2_Encode_MotionVectorEx8

```
typedef struct _VA2_Encode_MotionVectorEx8 {
    INT8     x;
    INT8     y;
    UINT8    ImageIndex;
    UINT8    Distance;
} VA2_Encode_MotionVectorEx8;
```

Members
x
x-coordinate of the Motion Vector.
y
y-coordinate of the Motion Vector.
ImageIndex
a zero based index into the list of reference images that was provided in the call to ComputeMotionVectors
Distance
the unit of measurement is specified by the DistanceMetric field of VA_Encode_MVSurface. It measures the distance of the current macroblock with the reference macroblock referred to by the actual motion vector (x, y)

3.6.9 VA2_Encode_MotionVectorEx16

```
typedef struct _VA2_Encode_MotionVectorEx16 {
    INT16     x;
    INT16     y;
    UINT16    ImageIndex;
    UINT16    Distance;
} VA2_Encode_MotionVectorEx16;
```

Members
x
x-coordinate of the Motion Vector.
y
y-coordinate of the Motion Vector.
ImageIndex
a zero based index into the list of reference images that was provided in the call to ComputeMotionVectors
Distance
the unit of measurement is specified by the DistanceMetric field of VA_Encode_MVSurface. It measures the distance of the current macroblock with the reference macroblock referred to by the actual motion vector (x, y)

3.7 Data Structures: Residues

In this implementation, a residue surface is an array of signed integer values that are two bytes long—e.g., of type INT16. This scheme is practical. For example, MPEG-2 deals with 9 bit residue values and H.264 deals with 12 bit residues. Also, if the original data was YUY2, the luma values occupy one byte each, and hence the residues use 9 bits (0–255=−255). Further, applying a DCT-type transform increases the data requirement to 11 bits per residue value. All of these cases are adequately addressed by using 2 byte long signed residue values.

The width of a residue surface is the number of residue values in a line. For example, a 640×480 progressive image with 4:2:2 sampling has 640 luma values and 320 chroma values per line. The size of associated the luma surface is 640×480×2 and that of the chroma surface is 320×480×2 bytes.

Residue Surfaces are created using the D3DFMT_RESIDUE16 format flag and VA2_EncodeBuffer resource type.

3.7.1 Luma Plane

Figure 9:
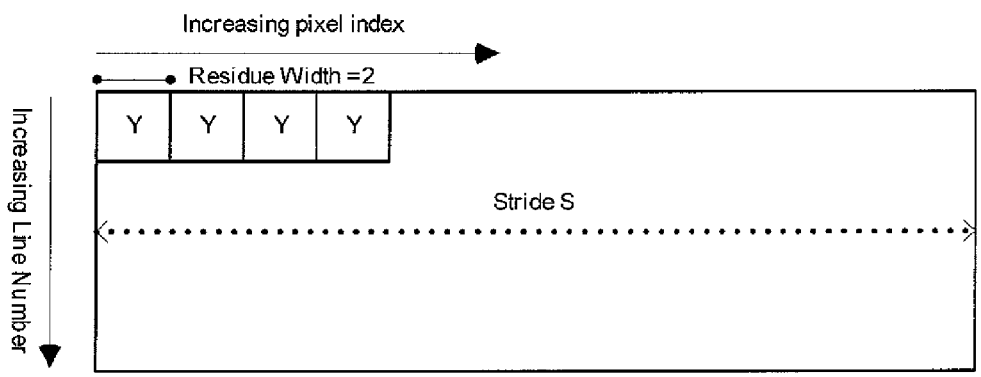
FIG. 9 in the Appendix shows an exemplary diagram indicating that width of a luma surface matches an original YCbCr image, according to one embodiment.

FIG. 9 shows an exemplary diagram indicating that width of the luma surface matches the original YCbCr image. For example, a 640×480 image has 480 luma values per line, and so the width of the luma surface is 480. So the size of the luma surface is 640×480×2 bytes.
Plane=VA2_Encode_Residue_Y
Sampling=VA2_Encode_SamplingType_*

3.7.2 Chroma 4:2:2

Figure 10:
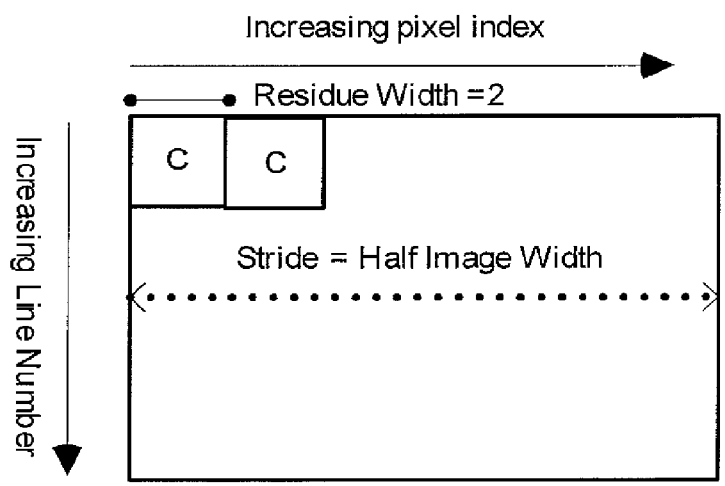
FIG. 10 in the Appendix shows an exemplary diagram indicating that the number of residue value per line of video is ½ width of the original video image, according to one embodiment.

FIG. 10 shows an exemplary diagram indicating that the number of residue value per line of video is half width of the original video image, according to one embodiment. Thus for a 640×480 image, the number of residue values per line and hence the width of the surface is 320.

Plane=VA2_Encode_Residue_U or VA_Encode_Residue_V
Sampling=VA2_Encode_SamplingType_422
3.7.3 Chroma 4:2:0

Figure 11:
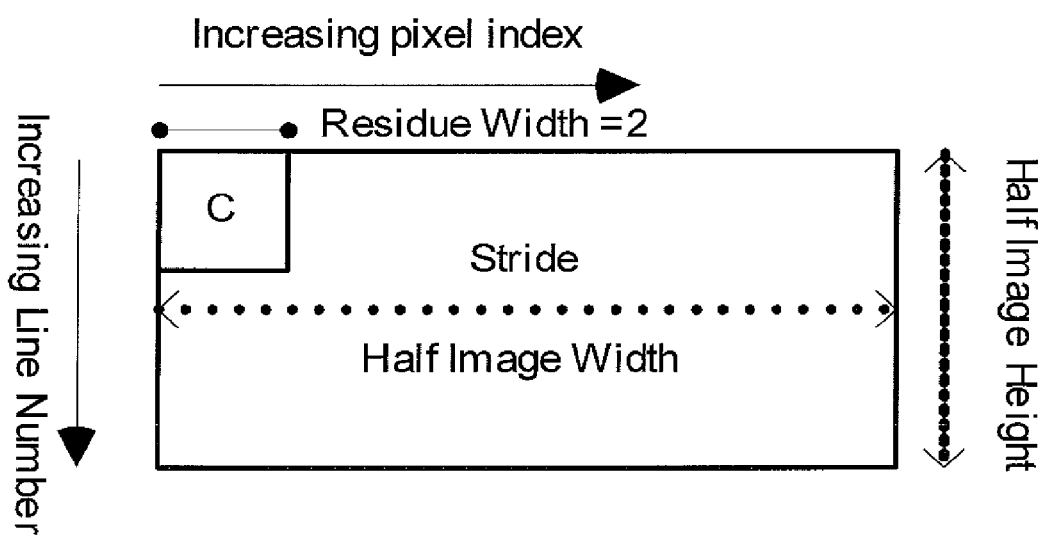
FIG. 11 in the Appendix shows an exemplary diagram indicating that the width of the residue surface is ¼ the width of the original progressive frame, according to one embodiment.

FIG. 11 shows an exemplary diagram indicating that the number of residue value per line of video is ¼ the width of the original progressive frame, according to one embodiment. Thus, for a 640×480 image, the chroma surface is 160.

Plane=VA2_Encode_Residue_U or VA_Encode_Residue_V
Sampling=VA2_Encode_SamplingType_420

4 Exemplary DDI Documentation

Extension Devices are a pass-through mechanism provided by the VA Interfaces to add new functionality in addition to Video Decoder and Video Processor functions. For example, in one implementation, such a mechanism is used to support a new Video Encoder function.

Extension Devices are analogous to an untyped funnel through which the application can send/receive data to/from the driver. The meaning of the data is unknown to the VA stack, and is interpreted by the driver based on the pGuid parameter of the CreateExtensionDevice call, and the Function parameter of ExtensionExecute.

VA Encode uses the following GUID value (same as the uuid of IVideoEncoder):

```
{7AC3D93D-41FC-4c6c-A1CB-A875E4F57CA4}
DEFINE_GUID(VA_Encoder_Extension, 0x7ac3d93d, 0x41fc,
0x4c6c, 0xa1, 0xcb, 0xa8, 0x75, 0xe4, 0xf5, 0x7c, 0xa4);
```

4.1 Enumeration and Capabilities

Extension Devices are enumerated using the FND3DDDI_GETCAPS with the type parameter being set to GETEXTENSIONGUIDCOUNT or GETEXTENSIONGUIDS. The codec application looks for VA_Encoder_Extension in the list of extension guids returned by GETEXTENSIONGUIDS to determine whether VA Encode support is available.

4.1.1 FND3DDDI_GETCAPS

```
typedef HRESULT
(APIENTRY *PFND3DDDI_GETCAPS)
(
    HANDLE hAdapter,
    CONST D3DDDIARG_GETCAPS*
);
```

When querying for capabilities of the extension device (the Encoder device), the GETEXTENSIONCAPS is used with the following structure as pInfo in the D3DDDIARG_GETCAPS structure.

4.1.2 VADDI_QUERYEXTENSIONCAPSINPUT

```
typedef struct _VADDI_QUERYEXTENSIONCAPSINPUT
{
    CONST GUID*            pGuid;
```

-continued

```
    UINT                   CapType;
    VADDI_PRIVATEDATA*     pPrivate;
} VADDI_QUERYEXTENSIONCAPSINPUT;
```

The pGuid parameter of VADDI_QUERYEXTENSIONCAPSINPUT is set to VA_Encoder_Extension.

```
#define VADDI_Encode_Captype_Guids             VADDI_EXTENSION_CAPTYPE_MIN
#define VADDI_Encode_Captype_DistanceMetrics   VADDI_EXTENSION_CAPTYPE_MIN + 1
#define VADDI_Encode_Captype_SearchProfiles    VADDI_EXTENSION_CAPTYPE_MIN + 2
#define VADDI_Encode_Captype_MECaps            VADDI_EXTENSION_CAPTYPE_MIN + 3
```

The output of GETEXTENSIONCAPS is encapsulated in the pData parameter of D3DDDIARG_GETCAPS. The pData parameter is interpreted as follows:

Captype_Guids: Type=(GUID*). DataSize=sizeof(GUID) *guid_count

Captype_DistanceMetrics: Type=(GUID*). DataSize=sizeof(GUID)* guid_count.

Captype_SearchProfiles: Type=(VADDI_Encode_SearchProfile*). DataSize=sizeof(VADDI_Encode_SearchProfile).

Captype_MECaps: Type=(VADDI_Encode_MECaps). DataSize=sizeof(VADDI_Encode_MECaps).

4.1.3 D3DDDIARG_CREATEEXTENSIONDEVICE

The actual creation happens via a D3DDDI_CREATEEXTENSIONDEVICE call, whose primary argument is shown below:

```
typedef struct _D3DDDIARG_CREATEEXTENSIONDEVICE
{
    CONST GUID*            pGuid;
    VADDI_PRIVATEDATA*     pPrivate;
    HANDLE                 hExtension;
} D3DDDIARG_CREATEEXTENSIONDEVICE;
```

4.2 Encode Functionality

The actual extension unit functions are invoked via a D3DDDI_EXTENSIONEXECUTE call. The instance of the Extension Unit is already associated with a GUID, so the type of the extension unit is already known when the execute call is made. The only additional parameter is Function which indicates the particular operation to perform. For example an Extension Device of type Encoder, may support MotionEstimation as one of its functions. Typically, the Extension Device will have a GetCaps function of its own that enumerates the capabilities of the Extension Device.

```
typedef struct _D3DDDIARG_EXTENSIONEXECUTE
{
    HANDLE                 hExtension;
    UINT                   Function;
    VADDI_PRIVATEDATA*     pPrivateInput;
    VADDI_PRIVATEDATA*     pPrivateOutput;
    UINT                   NumBuffers;
    VADDI_PRIVATEBUFFER*   pBuffers;
} D3DDDIARG_EXTENSIONEXECUTE;
```

The pBuffers parameter is not used by VA Encode, and should be considered a reserved parameter. The Function parameter takes the following values for VA Encode:

define VADDI_Encode_Function_Execute 1

The pPrivateInput and pPrivateOutput parameters of D3DDDIARG_EXTENSIONEXECUTE are used to encapsulate the parameters of the Execute API call.

4.2.1 VADDI_Encode_Function_Execute_Input

This parameter contains the input parameters to the Execute API call.

```
typedef struct _VADDI_Encode_Function_Execute_Input
{
    UINT32 NumDataParameters;
    VA2_Encode_ExecuteDataParameter** pData;
    UINT32 NumConfigurationParameters;
    VA2_Encode_ExecuteConfigurationParameter** pConfiguration;
} VADDI_Encode_Function_Execute_Input;
```

4.2.2 VADDI_Encode_Function_Execute_Output

This structure encapsulates the output data from the Execute call.

```
typedef struct _VADDI_Encode_Function_Execute_Output
{
    UINT32 NumDataParameters;
    VA2_Encode_ExecuteDataParameter** pData;
} VADDI_Encode_Function_Execute_Output;
```

4.3 Extension Device Structures

The following sections describe various structures and function callbacks associated with the VA Extension mechanism.

4.3.1 VADDI_PRIVATEBUFFER

```
typedef struct _VADDI_PRIVATEBUFFER
{
    HANDLE   hResource;
    UINT     SubResourceIndex;
    UINT     DataOffset;
    UINT     DataSize;
} VADDI_PRIVATEBUFFER;
typedef struct _VADDI_PRIVATEDATA
{
    VOID*    pData;
    UINT     DataSize;
} VADDI_PRIVATEDATA;
```

4.3.2 D3DDDIARG_EXTENSIONEXECUTE

```
typedef struct _D3DDDIARG_EXTENSIONEXECUTE
{
    HANDLE              hExtension;
    UINT                Function;
    VADDI_PRIVATEDATA*  pPrivateInput;
    VADDI_PRIVATEDATA*  pPrivateOutput;
    UINT                NumBuffers;
    VADDI_PRIVATEBUFFER* pBuffers;
```

-continued

```
} D3DDDIARG_EXTENSIONEXECUTE;
typedef HRESULT
    (APIENTRY *PFND3DDDI_CREATEEXTENSIONDEVICE)
    (
        HANDLE hDevice,
        D3DDDIARG_CREATEEXTENSIONDEVICE*
    );
```

The hDevice parameter refers to a D3D9 device, and it is created using a call to D3DDDI_CREATEDEVICE.

4.3.3 FND3DDDI_DESTROYEXTENSIONDEVICE

```
typedef HRESULT
    (APIENTRY *PFND3DDDI_DESTROYEXTENSIONDEVICE)
    (
        HANDLE hDevice,
        HANDLE hExtension
    );
```

4.3.4 FND3DDDI_EXTENSIONEXECUTE

```
typedef HRESULT
    (APIENTRY *PFND3DDDI_EXTENSIONEXECUTE)
    (
        HANDLE hDevice,
        CONST D3DDDIARG_EXTENSIONEXECUTE*
    );
```

4.3.5 D3DDDI_DEVICEFUNCS

```
typedef struct _D3DDDI_DEVICEFUNCS
{
    PFND3DDDI_CREATEEXTENSIONDEVICE    pfnCreateExtensionDevice;
    PFND3DDDI_DESTROYEXTENSIONDEVICE   pfnDestroyExtensionDevice;
    PFND3DDDI_EXTENSIONEXECUTE         pfnExtensionExecute;
} D3DDDI_DEVICEFUNCS;
```

4.4 D3D9 Structures and Functions

The following D3D structures and callback represent a generic D3D mechanism to obtain the capabilities of an extension device.

```
typedef enum _D3DDDICAPS_TYPE
{
    D3DDDICAPS_GETEXTENSIONGUIDCOUNT    =31,
    D3DDDICAPS_GETEXTENSIONGUIDS        =32,
    D3DDDICAPS_GETEXTENSIONCAPS         =33,
} D3DDDICAPS_TYPE;
typedef struct _D3DDDIARG_GETCAPS
{
    D3DDDICAPS_TYPE   Type;
    VOID*             pInfo;
    VOID*             pData;
    UINT              DataSize;
} D3DDDIARG_GETCAPS;
```

5 Exemplary Programming Model 5.1 Pipeline Efficiency

In one implementation, to achieve maximum efficiency, the encoder application 116 is structured to full utilize processor(s) 104 and graphics hardware 130. In one example, while Motion Estimation is in progress for a certain frame, the Quantization Step may be executed on a different frame.

Obtaining full hardware utilization is facilitated with a multi-threaded encoder.

5.1.1 Example: Single Motion Vector (Pipeline Full)

The following 2-threaded application (in pseudo-code) illustrates one way for the encoder 116 to implement a 2-stage software pipeline, and offers some examples of how to use the VA Encode interfaces 128 effectively. This particular implementation enforces a buffering of k=AllocatorSize as seen in the software thread. This accounts that there is asynchrony in the submission of a hardware request: the hardware thread submits requests while the software thread picks up the results after a while and processes them.

```
HardwareThread( )
{
    while (Streaming)
    {
        LoadFrame(ppInputBuffer[n]);
        Codec->ProcessInput(ppInputBuffer[n]); // blocking GetBuffer +
        Execute
    }
}
SoftwareThread( )
{
    k = AllocatorSize( );
    while (Streaming)
    {
        // k represents the buffer between pipeline stages
        Codec->ProcessOutput(ppOutputBuffer[n-k]); // Wait, ReleaseBuffer
        VLE( );
        Bitstream( );
    }
}
```

ProcessInput above may be considered a wrapper around Execute and GetBuffer, while ProcessOutput may be considered a wrapper around a Wait on the execute event, followed up with appropriate ReleaseBuffer calls.

Parameter k represents the buffer between the pipeline stages. It denotes the allocator size, and as a starting point, we could use the same value used in the allocator negotiation between the Codec and the VA Encoder object (the queue length). If k is larger than the allocator size, then the ProcessInput call is likely to block anyway even before the k buffers get used.

The goal of the application should be to maximize time spent in SoftwareThread without blocking on ProcessOutput. In other words the application should be working on the VLE( ) and Bitstream( ) functions most of the time. If the hardware is very slow, then ProcessOutput( ) will block despite the allocator size of "k". Software will always be "ahead". The above pipeline is efficient only to the extent that the hardware takes about as much time to process a buffer as software takes to run VLE and Bitstream. All that the buffering of "k" achieves is to pad for jitters.

The following code fragment shows an exemplary pseudocode implementation of GetBuffer and ReleaseBuffer.

```
IVideoEncoder::GetBuffer(Type, ppBuffer, Blocking)
{
    if (Empty)
    {
        if (Blocking) Wait(NotEmptyEvent);
        else return STATUS_EMPTY;
    }
    *ppBuffer = pQueue[Type][Head];
    Head++;
    if (Head == Tail)
```

```
    {
        Empty = 1;
        ResetEvent(NotEmptyEvent);
    }
    return S_OK;
}
IVideoEncoder::ReleaseBuffer(Type, pBuffer)
{
    if ((Tail == Head) && !Empty) return STATUS_FULL;
    pQueue[Type][Tail] = pBuffer;
    Tail++;
    if (Empty)
    {
        Empty = false;
        SetEvent(NotEmptyEvent);
    }
    return S_OK;
}
```

The following sketches out the codec's implementation of ProcessInput and ProcessOutput:

```
// this implementation is blocking contrary to normal semantics
Codec::ProcessInput(IMediaBuffer pInput)
{
    GetBuffer(TypeUncompressed, pYUVBuffer, true);
    GetBuffer(TypeMotionVector, pMVBuffer, true);
    GetBuffer(TypeResidues, pResidueBuffer, true);
    memcpy(pYUVBuffer, pInput.Image);
    Execute(pYUVBuffer, pMVBuffer, pResidueBuffer, pEvent);
    CodecQueue.Enqueue(pYUVBuffer, pMVBuffer, pResidueBuffer,
    pEvent);
}
Codec::ProcessOutput(IMediaBuffer pOutput)
{
    if (CodecQueue.Empty( ))
    {
        pOutput.dwFlags =
        DMO_OUTPUT_DATABUFFERF_INCOMPLETE;
        return S_FALSE;
    }
    CodecQueue.Dequeue(pYUVBuffer, pMVBuffer, pResidueBuffer,
    pEvent);
    Wait(pEvent);
    memcpy(pOutput.MVBuffer, pMVBuffer);
    memcpy(pOutput.ResidueBuffer, pResidueBuffer);
    ReleaseBuffer(TypeUncompressed, pYUVBuffer);
    ReleaseBuffer(TypeMotionVector, pMVBuffer);
    ReleaseBuffer(TypeResidues, pResidueBuffer);
    return S_OK;
}
```

Here is an alternate implementation of Codec::ProcessInput that is non-blocking as is the norm.

```
Codec::ProcessInput(IMediaBuffer pInput)
{
    if (GetBuffer(TypeUncompressed, pYUVBuffer, false) ==
    STATUS_EMPTY)
    {
        return DMO_E_NOTACCEPTING;
    }
    if (GetBuffer(TypeMotionVector, pMVBuffer, false) ==
    STATUS_EMPTY)
    {
        return DMO_E_NOTACCEPTING;
    }
    if (GetBuffer(TypeResidues, pResidueBuffer, false) ==
    STATUS_EMPTY)
    {
        return DMO_E_NOTACCEPTING;
    }
```

```
        memcpy(pYUVBuffer, pInput.Image);
        Execute(pYUVBuffer, pMVBuffer, pResidueBuffer, pEvent);
        CodecQueue.Enqueue(pYUVBuffer, pMVBuffer, pResidueBuffer,
            pEvent);
    }
```

5.1.2 Example: Multiple Motion Vectors

An exemplary complex pipeline is now described, where the encoder 116 requests multiple motion vectors from hardware and chooses one based on various parameters and resubmits them for processing. The following code naively continues to use a 2-stage pipeline as before, requests multiple motion vectors and resubmits the best one. There is inherent serialization involved in this.

```
HardwareThread( )
{
    while (Streaming)
    {
        LoadFrame(ppInputBuffer[n]);
        ProcessInput(ppInputBuffer[n]);
        ProcessOutput(ppOutputBuffer[n]);
        SelectMV(ppOutputBuffer[n], ppOutputBuffer2[n]);
        ProcessInput2(ppOutputBuffer2[n]);
        n++;
    }
}
SoftwareThread( )
{
    while (Streaming)
    {
        ProcessOutput2(ppOutputBuffer2[n – k]);
        VLE(ppOutputBuffer2[n – k]);
        Bitstream(ppOutputBuffer2[n – k]);
    }
}
```

In the above example, software operatios are blocked on ProcessOutput and ProcessOutput2 half of the time, negatively effecting pipeline efficiency. On the other hand CPU utilization will be quite low, and the overall throughput is still higher than non-accelerated encode.

A 3-stage pipeline based on 3 threads will solve the serialization problem as follows:

```
HardwareThread1( )
{
    while (Streaming)
    {
        LoadFrame(ppInputBuffer[n]);
        ProcessInput(ppInputBuffer[n]);
    }
}
HardwareThread2( )
{
    while (Streaming)
    {
        ProcessOutput(ppOutputBuffer[n – k1]);
        SelectMV(ppOutputBuffer[n – k1], ppOutputBuffer2[n – k1]);
        ProcessInput2(ppOutputBuffer2[n – k1]);
    }
}
SoftwareThread( )
{
    while (Streaming)
    {
        ProcessOutput2(ppOutputBuffer2[n – k1 – k2]);
        VLE(ppOutputBuffer2[n – k1 – k2]);
        Bitstream(ppOutputBuffer2[n – k1 – k2]);
    }
}
```

Since there are 3 pipeline stages, additional buffer is added to pad between the two hardware stages. Hence the two values k1 and k2.

The invention claimed is:

1. A method at least partially implemented by one or more processors of a computing device, the method comprising:
    receiving, by a video encoding acceleration service implemented by the one or more processors of the computing device, one or more queries from a video encoder to identify implementation specifics of acceleration hardware;
    responsive to receiving the one or more queries, the video encoding acceleration service:
    interfacing with the acceleration hardware to obtain the implementation specifics;
    responsive to receiving the implementation specifics, communicating the implementation specifics to the video encoder; and
    wherein the implementation specifics enable the video encoder during runtime to:
        determine whether one or more of speed and quality of software encoding operations associated with the video encoder can be increased with implementation of a particular encoding pipeline of one or more supported encoding pipeline configurations and capabilities, the particular encoding pipeline being designed to reduce dataflow transitions between busses and/or processors associated with the computing device and the acceleration hardware at least in part by causing data associated with the queries to remain in a memory associated with the acceleration hardware for successive stages of processing, the particular encoding pipeline performing one or more encoding operations in software and the one or more encoding operations in the acceleration hardware; and
        implement the particular encoding pipeline by interfacing with the video encoding acceleration service.

2. The method of claim 1, wherein the software encoding operations comprise one or more of motion estimation, residue computation, motion compensation, and transform operations.

3. The method of claim 1, wherein the software encoding operations comprise one or more of noise reduction, image stabilization, edge detection, sharpening, and frame rate conversion operations.

4. The method of claim 1, wherein the one or more queries comprise a get capabilities query, and wherein received implementation specifics include information associated with the one or more supported encoding pipeline configurations.

5. The method of claim 1, wherein the one or more queries comprise a get distance metrics query, and wherein received implementation specifics include a description of one or more search metrics supported by the video encoding acceleration hardware for motion estimation operations.

6. The method of claim 1, wherein the one or more queries comprise a get search profiles query, and wherein received implementation specifics include a description of one or more search profiles supported by the video encoding acceleration hardware, the one or more search profiles allowing the video encoder to evaluate implementation specific trade-offs between video encoding processing times and video encoding quality metrics.

7. The method of claim 1, wherein the one or more queries comprise a get motion estimation capabilities query, and wherein received implementation specifics include data indicating one or more of maximum supported image size, maximum supported search window size, and an indication of whether acceleration hardware supports variable macro block sizes.

8. The method of claim 1, further comprising:
receiving, by the video encoding acceleration service, a request including a set of configuration parameters to create an object that implements the particular encoding pipeline; and
responsive to receiving the request, creating the object based on the configuration parameters, the object for encoding decoded source video data using the particular encoding pipeline.

9. The method of claim 8, wherein the configuration parameters specify one or more of the particular encoding pipeline, an output format for encoded video, a number of I/O data streams for association with the particular encoding pipeline, static configuration properties for interpolation of luma and chroma values, a suggested number of data buffers for the I/O data streams, and a graphics device driver specified queue size based on available resources.

10. The method of claim 1, further comprising:
receiving, by the video encoding acceleration service, execute requests and a set of parameters from the video encoder, the execute requests corresponding to operations associated with the particular encoding pipeline to encode decoded source video data;
responsive to receiving the execute requests, the video encoding acceleration service:
communicating the execute requests and the parameters to the acceleration hardware;
receiving responses associated with the communicated execute requests from the acceleration hardware; and
forwarding the responses to the video encoder.

11. A computer-readable storage device comprising computer-program instructions executable by a processor for:
communicating, by a video encoder program module, one or more requests to a video encoding acceleration service to identify capabilities of one or more of video encoding pipeline configurations and capabilities supported by acceleration hardware;
responsive to receiving the capabilities from the video encoding acceleration service, the video encoder program module:
identifying, based on the capabilities, one or more video encoding operations associated with the video encoder program module that will benefit from one or more of speed and quality if implemented by the acceleration hardware based at least in part on a selected search profile, the selected search profile including meta-data to identify a search algorithm used by the acceleration hardware; and
requesting, by the video encoder program module, the video encoding acceleration service to create a customized video encoding pipeline for implementing the one or more video encoding operations via the acceleration hardware, the customized video encoding pipeline designed to reduce dataflow transitions between busses and/or the processor such that any remaining video encoding operations are implemented in software.

12. The computer-readable storage device of claim 11, wherein the one or more video encoding operations comprise one or more of motion estimation, residue computation, motion compensation, and transform operations.

13. The computer-readable storage device of claim 11, wherein the one or more video encoding operations comprise one or more of noise reduction, image stabilization, edge detection, sharpening, and frame rate conversion operations.

14. The computer-readable storage device of claim 11, wherein the computer-program instructions for requesting further comprise instructions for directing the video encoding acceleration service to create the customized video encoding pipeline such that data flow between system memory and graphics device memory is minimized.

15. The computer-readable storage device of claim 11, further comprising computer-program instructions executable by the processor for:
receiving, by the video encoder, encoded or decoded source video data; and
if received source video data is encoded, at least partially decoding, by the video encoder, the source video data to generate decoded source video data for encoding by an encoding object created by the video encoding acceleration service, the encoding object implementing the customized video encoding pipeline.

16. The computer-readable storage device of claim 11, wherein the computer-program instructions further comprise instructions for encoding decoded source video data using the customized video encoding pipeline.

17. A computing device comprising:
a processor coupled to memory; and
a module maintained in the memory and executable on the processor for implementing a video encoding acceleration service to:
receive one or more queries from a video encoder, the one or more queries requesting the video encoding acceleration service to identify implementation specifics of acceleration hardware, the implementation specifics for enabling the video encoder to:
determine whether one or more of speed and quality of software encoding operations associated with the video encoder can be increased with implementation of a particular encoding pipeline of one or more supported encoding pipeline configurations and capabilities, the particular encoding pipeline being designed to reduce dataflow transitions between busses and/or processors associated with the computing device and the acceleration hardware at least in part by causing data associated with the queries to remain in a memory associated with the acceleration hardware for successive stages of processing, the particular encoding pipeline performing one or more encoding operations in software and the one or more encoding operations in the acceleration hardware;
implement the particular encoding pipeline via the video encoding acceleration service to encode decoded source video data;
query the acceleration hardware to obtain the implementation specifics; and
communicate implementation specifics received from the acceleration hardware to the video encoder.

18. The computing device of claim 17, wherein the software encoding operations comprise one or more of motion estimation, residue computation, motion compensation, and transform operations.

19. The computing device of claim 17, wherein the software encoding operations comprise one or more of noise reduction, image stabilization, edge detection, sharpening, and frame rate conversion operations.

20. The computing device of claim 17, wherein the module when executed by the one or more processors cause, cause the one or more processors to:
- receive a create encoder object request from the video encoder to create an encoder object that implements the particular encoding pipeline;
- receive one or more execute requests from the video encoder to implement operations associated with the particular encoding pipeline in the acceleration hardware; and
- forward information associated with the one or more execute requests to the acceleration hardware to encode the decoded source video data.

* * * * *